(12) United States Patent
Mival et al.

(10) Patent No.: US 8,398,111 B2
(45) Date of Patent: Mar. 19, 2013

(54) PUSHCHAIR FRAME

(75) Inventors: Nicholas James Mival, Ibstone (GB); Andrew Gordon Wallace, Highleadon (GB); Martin Paul Bagwell, Leamington Spa (GB); Mark Anthony John Fernandes, Leamington Spa (GB); Benjamin James Peter Hubert, London (GB); Simon Lewis Bilton, Leamington Spa (GB)

(73) Assignee: Mamas and Papas (Holdings) Ltd., Huddersfield (GB)

( * ) Notice: Subject to any disclaimer, the term of this patent is extended or adjusted under 35 U.S.C. 154(b) by 133 days.

(21) Appl. No.: 12/808,209

(22) PCT Filed: Dec. 16, 2008

(86) PCT No.: PCT/GB2008/051193
§ 371 (c)(1),
(2), (4) Date: Aug. 31, 2010

(87) PCT Pub. No.: WO2009/077788
PCT Pub. Date: Jun. 25, 2009

(65) Prior Publication Data
US 2010/0314855 A1    Dec. 16, 2010

(30) Foreign Application Priority Data

Dec. 17, 2007  (GB) .................................. 0724513.7

(51) Int. Cl.
*B62B 1/00*   (2006.01)
*B62B 3/00*   (2006.01)

(52) U.S. Cl. ....................................... 280/648; 280/650

(58) Field of Classification Search ............. 280/33.993, 280/47.38, 639, 642, 643–644, 647–648, 280/649–650, 658
See application file for complete search history.

(56) References Cited

U.S. PATENT DOCUMENTS 3,389,818 A * 6/1968 Rinehart ...................... 414/446
(Continued)

FOREIGN PATENT DOCUMENTS

| AU | 2007100862 A4 | 11/2007 |
| DE | 10011588 A1 | 1/2001 |

(Continued)

*Primary Examiner* — John Walters
*Assistant Examiner* — James Triggs
(74) *Attorney, Agent, or Firm* — Gordon & Jacobson, PC

(57) ABSTRACT

An improved pushchair frame (10) of a type that can be collapsed for ease of transport or storage etc. The frame comprising a push/pull handle (12), a front wheel frame (14) on which at least one front wheel (16) is rotatably mounted and a rear wheel frame (18) on which at least one rear wheel (20) is rotatably mounted. The frame comprising a seat mounting yoke (22) to which the front and rear wheel frames are coupled, at least one of the front and rear wheel frames being pivotably coupled to the yoke, the frames having an operating position in which they are spaced from one another and a stowed position in which they are generally adjacent one another. The seat mounting yoke is rotatable, relative to at least one of the front and rear wheel frames, between an operating position and a stowed position in which the yoke is located generally adjacent one of the front and rear wheel frames. A retaining means maintains the yoke and the front and rear wheel frames in their operating position. When the retaining means are released, the yoke and the front and rear wheel frames may be moved to their stowed positions, thereby folding the pushchair frame.

17 Claims, 24 Drawing Sheets

U.S. PATENT DOCUMENTS

| | | | | |
|---|---|---|---|---|
| 5,257,799 A | * | 11/1993 | Cone et al. | 280/642 |
| 6,105,998 A | * | 8/2000 | Baechler et al. | 280/650 |
| 6,513,827 B1 | * | 2/2003 | Barenbrug | 280/648 |
| 6,991,248 B2 | * | 1/2006 | Valdez et al. | 280/647 |
| 7,077,420 B1 | * | 7/2006 | Santoski | 280/642 |
| 7,281,732 B2 | * | 10/2007 | Fox et al. | 280/642 |
| 7,694,996 B2 | * | 4/2010 | Saville et al. | 280/642 |
| 7,753,398 B2 | * | 7/2010 | Yang | 280/642 |
| 7,832,756 B2 | * | 11/2010 | Storm | 280/642 |
| 8,061,732 B2 | * | 11/2011 | Song et al. | 280/650 |
| 8,083,240 B2 | * | 12/2011 | Jacobs et al. | 280/47.38 |
| 2006/0214396 A1 | * | 9/2006 | Horacek | 280/642 |
| 2007/0096434 A1 | * | 5/2007 | Haeggberg | 280/642 |
| 2007/0164538 A1 | * | 7/2007 | Yeh | 280/642 |
| 2007/0296182 A1 | * | 12/2007 | Saville et al. | 280/642 |
| 2008/0093824 A1 | * | 4/2008 | Chen et al. | 280/642 |
| 2008/0315562 A1 | * | 12/2008 | Song et al. | 280/650 |
| 2010/0314855 A1 | * | 12/2010 | Mival et al. | 280/650 |

FOREIGN PATENT DOCUMENTS

DE    202005014398 U1    1/2006

* cited by examiner

PUSHCHAIR FRAME

BACKGROUND OF THE INVENTION

1. Field of the Invention

The present invention relates to a pushchair frame, and in particular to a foldable pushchair frame.

2. State of the Art

The product to which the invention relates is referred to as a "pushchair" in the UK, but is also known as a "stroller" or "buggy" in other countries. The term pushchair is therefore used herein to mean a pushchair, stroller or buggy.

Parents and carers often need to disassemble and collapse a child's pushchair in order to be able to put the pushchair into a vehicle or to carry the pushchair onto public transport. However, in so doing, the parent or carer is commonly faced with the difficult task of attempting to disassemble and collapse the pushchair by a single-handed operation, due to the need to hold the child while collapsing the frame. In many cases, collapsing the pushchair may also require the seat of the pushchair to be at least partially or completely removed before the frame can be collapsed, thereby further complicating the procedure for the parent or carer. Although, some existing pushchair designs are easier to operate than others, many of the existing designs are known to be poorly adapted for such single-handed operation and may be quite challenging to manipulate by a lone individual.

SUMMARY OF THE INVENTION

Moreover, a further drawback with existing pushchairs is that many of them have large and bulky frames, which do not collapse down to adequately small sizes, making it generally difficult to manoeuvre the pushchair into the vehicle or onto the public transport.

It is an object of the present invention to provide an improved pushchair frame.

According to the present invention there is provided a pushchair frame, comprising:
 a push/pull handle;
 a front wheel frame on which at least one front wheel is rotatably mounted;
 a rear wheel frame on which at least one rear wheel is rotatably mounted;
 a seat mounting yoke to which the front and rear wheel frames are coupled, at least one of the front and rear wheel frames being pivotably coupled to the yoke, the frames having an operating position in which they are spaced from one another and a stowed position in which they are generally adjacent one another;
 the seat mounting yoke being rotatable, relative to at least one of the front and rear wheel frames, between an operating position and a stowed position in which the yoke is located generally adjacent one of the front and rear wheel frames; and
 retaining means adapted to maintain the yoke and the front and rear wheel frames in their operating position,
 such that when the retaining means are released, the yoke and the front and rear wheel frames may be moved to their stowed positions, thereby folding the pushchair frame.

Provision of a seat-mounting yoke to which the front and rear wheel frames are coupled, such that at least one of the front and rear wheel frames is pivotably coupled to the yoke, allows the pushchair frame to be folded by permitting the separation between the front and rear wheel frames to be reduced such that they can be placed into a stowed position in which they are generally adjacent one another. In addition, the functionality to allow at least one of the front and rear wheel frames to pivot relative to the yoke enables the pushchair frame to be folded when a seat is attached to the frame, thereby avoiding the need for the parent or carer to remove the seat prior to folding the frame.

Preferably, the pushchair frame is arranged such that both of the front and rear wheel frames are pivotably coupled to the seat mounting yoke. In this way, both wheel frames are able to move relative to the other and to the yoke, such that they may be placed into a stowed position in which both frames are generally adjacent one another. In this way, the folding of the frame is found to be much easier, as either or both wheel frame(s) can be pivoted, thereby making the procedure more convenient for the parent or carer, particularly if only a single-handed operation is possible.

Provision of a seat mounting yoke that is rotatable relative to at least one of the front and rear wheel frames further improves the folding of the pushchair frame, in that it at least minimises the size of the folded pushchair when in its stowed position. This is because a rotatable yoke may be placed in a position in which it is located generally adjacent to one of the front and rear wheel frames, thereby minimising the physical width extent of the folded frame when in its stowed position. A rotatable yoke also enables an attached seat to be folded down adjacent to, or abutting against, the folded frame, which further minimises the size of the folded pushchair and avoids the need for the parent or carer to remove the seat prior to folding the frame.

Preferably the seat mounting yoke is rotatable relative to both the front wheel frame and the rear wheel frame, which advantageously enables the yoke to be placed in either front or rear stowed positions generally adjacent the front and rear wheel frames respectively. The provision of a yoke that is rotatable relative to both the front and rear wheel frames thereby permits the pushchair frame to placed into one of two different stowed positions, which is found to be particularly advantageous when using front or rear facing seats. Hence, if a front-facing seat is attached to the pushchair frame, the yoke may be placed in a front stowed position, while for a rear-facing seat the yoke may be placed in a rear stowed position, as required. As a result, the parent or carer has the convenience of optionally folding the pushchair frame into one of two different stowed positions, depending on the orientation of the attached seat, which thereby simplifies collapsing the pushchair for transit or storage—particularly if the procedure is to be carried out by a single-handed operation.

By "front-facing" we mean an orientation in which the seat generally faces the direction of travel of the pushchair and as such the child normally has their back to the parent or carer. Conversely, by "rear-facing" we mean an orientation in which the seat generally faces away from the direction of travel of the pushchair and in which the child normally faces the parent or carer.

To facilitate operation and manipulation of the pushchair frame, at least one carrying handle is preferably disposed on the rotatable yoke. The handle may be manually gripped by the parent or carer to facilitate collapsing and subsequent unfolding of the frame, as well as being useful for carrying the folded frame. Preferably, the pushchair frame comprises a pair of carrying handles, preferably oppositely disposed on either side of the yoke. In other words, one handle is preferably provided towards the front-facing side of the yoke and the other is preferably provided towards the rear-facing side of the yoke. An advantage of providing two oppositely opposed handles is that ease of operation can be maintained irrespective of whether the attached seat is either front-facing or rear-facing, as the parent or carer can manually grip whichever handle is on the side of the pushchair that is most convenient for them.

It is to be understood, however, that the carrying handle or handles may be positioned at any suitable location, and in any appropriate orientation, on the pushchair frame without sacrificing any of the advantages of the present invention. Moreover, additional handles may be included to further facilitate manipulation of the pushchair frame depending on the particular application of the frame.

Each carrying handle may be ergonomically designed for comfort and may include a texturised surface for enhanced grip.

The retaining means are preferably disposed on the yoke. The function of the retaining means is to maintain the yoke and the front and rear wheel frames in their operating positions. Preferably, the retaining means comprise a releasable locking mechanism that is operable to lock the yoke and the front and rear wheel frames in their operating positions when the pushchair is in use.

Preferably, the pushchair frame further comprises actuation means coupled to the releasable locking mechanism and operable to unlock the yoke and the front and rear wheel frames from their operating position. The actuation means are arranged for operation by the parent or carer and are preferably disposed on each of the carrying handles, or alternatively, on the push/pull handle, or both as required. In preferred arrangements, the actuation means are integrally combined with each carrying handle, such that each handle includes an elongate depressible 'pad' mounted on a rotatable grip that when depressed releases the grip so that it may be partly or fully rotated in order to facilitate unlocking of the releasable locking mechanism. The actuation means are preferably connected to the locking mechanism by way of a mechanical coupling. In preferred embodiments, each carrying handle may independently perform the function of unlocking the yoke and the front and rear wheel frames from their operating position, in response to the parent or carer performing a 'press and twist' action on either carrying handle.

By "operating position" we mean the position the pushchair frame adopts during normal use of the pushchair (i.e. when not collapsed or stowed), and corresponds to an arrangement in which the front and rear wheel frames are spaced from one another and the yoke is in an orientation in which it is neither generally adjacent to either the front or rear wheel frames. In such a position the yoke may typically be regarded as being in a substantially "upright" position relative to the wheel frames and the surface of the ground or floor on which the wheels are located.

The mechanical coupling may be a flexible linkage in the form of a cable or wire, such as made from a high tensile steel wire. Alternatively, the linkages may be in the form of a strong, inelastic cord, such as nylon etc.

In an alternative arrangement, the retaining means may comprise at least one tensionable engagement member in the form of a webbing strap coupled to the front wheel frame and the rear wheel frame. Preferably, the retaining means comprises two such straps that, in addition to maintaining the yoke and front and rear wheel frames in their operating position, also acts as a self-righting mechanism operable to automatically move the yoke into its operating position as the front and rear wheel frames are moved from their stowed to their operating position, as will be discussed in more detail below.

It is to be understood, however, that the retaining means and actuation means may take the form of any suitable device and/or mechanism that is able to perform the function of releasing the yoke and the front and rear wheel frames, so that the pushchair frame may be folded and collapsed into one or more stowed positions. Moreover, the retaining means and actuation means may respectively be disposed on any suitable part of the pushchair frame, while still achieving the advantages of the present invention.

In preferred arrangements, the push/pull handle of the pushchair frame comprises two sections: an upper part adapted to be manually gripped by a parent or carer and a lower part preferably coupled to the yoke, and most preferably pivotally coupled to the yoke. To further minimise the overall size of the pushchair frame when in a stowed position, the push/pull handle advantageously includes hinge means provided between, and coupling, the upper part and the lower part of the handle, such that the upper part is moveable between a operating position and a stowed position generally adjacent the rear wheel frame. In this way, the push/pull handle may also be collapsed when the pushchair frame is folded, making it easier for the parent or carer to manoeuvre the pushchair and put it into a vehicle or onto public transport.

The hinge means preferably comprise at least one pair of lockable hinge joints that are coupled to the actuation means. One hinge joint is preferably provided on each side of the push/pull handle and each joint is configured to be unlocked by action of the actuation means (e.g. upon applying a press and twist action to at least one of the carrying handles).

The hinge joints are preferably connected to the actuation means on each of the carrying handles by way of flexible linkages or other form of mechanical coupling, such that each actuation means is able to independently unlock the push/pull handle during folding of the pushchair frame. Preferably, the hinge joints comprise a locking device, which enables the upper part of the handle to be unlocked and to pivot about the joints so that it can be stowed in a position such that the upper part of the handle is generally adjacent to the rear wheel frame.

The pushchair frame preferably further comprises a link member coupled between the upper part of the push/pull handle and the rear wheel frame, such that movement of the upper part of the handle causes related pivoting movement of the rear wheel frame. In this way, unfolding of the frame can be easily facilitated, as movement of the upper part of the handle pulls the rear wheel frame apart from the front wheel frame as the frame is unfolded.

Preferably, the pushchair frame further comprises a 'self-righting mechanism' associated with, and preferably integral to, the seat mounting yoke. The self-righting mechanism preferably couples the yoke to the front wheel frame and to the rear wheel frame, and is preferably operable to automatically move the yoke into its "upright" operating position as the front and rear wheel frames are moved from their stowed to their operating position.

The self-righting mechanism may comprise gear means, such as a planetary gear arrangement, or may comprise mechanical cam means. Preferably, the self-righting mechanism may comprise one or more tensionable flexible engagement members adapted to engage with the seat mounting yoke, which in some arrangements, may also function as retaining means for maintaining the yoke and front and rear wheel frames in their operating position. The tensionable flexible engagement members preferably comprise elongate flexible straps, and most preferably comprise fabric webbing straps. However, it is to be understood that any suitable device or mechanism that is able to move the yoke into its operating position as the front and rear wheel frames are moved from their stowed to their operating position may be used in conjunction with the pushchair frame of the present invention.

In some arrangements, the self-righting mechanism may only be configured to restore the yoke to its operating position according to a prescribed direction of rotation of the yoke. Therefore, the self-righting mechanism may be configured to level the yoke only following unfolding from a forward stowed position, and not when unfolded from a rear stowed position. Hence, as the pushchair frame is unfolded from its front stowed position, the yoke will automatically adopt its operating position without the need for the parent or carer to manually level the yoke before the pushchair can be used. In this way, the pushchair frame may be easily and conveniently unfolded without undue difficulty for the parent or carer. In another arrangement, the self-righting mechanism may alternatively be configured to level the yoke only following unfolding from a rear stowed position. While in a further arrangement, the self-righting mechanism may also be arranged to allow levelling of the yoke independently of the direction of rotation of the yoke, depending on the particular configuration of the pushchair.

It is to be appreciated that the pushchair frame of the present invention may be used in conjunction with any suitable pushchair seat or child seating arrangement that is able to be mounted on the seat mounting yoke, and is most preferably used with seats that themselves have some form of folding or collapsing function. Therefore, although the present frame is ideally suited for foldable pushchair seats, it may also be adapted for use with child safety seats, collapsible cots or combined seats and cots etc. depending on the particular application and desired mode of operation. Hence, it is to be understood that any references herein to "seat" are to be taken to include any form of pushchair seat, child safety seat, cot or other seating means, optionally having some folding function.

An embodiment of the invention will now be described in more detail, by way of example only, with reference to the accompanying drawings. Moreover, a single frame may be used in conjunction with a plurality of different types of interchangeable seat, whereby the yoke may be modified to include a universal attachment by which the seats may be mounted and subsequently released.

Embodiments of the invention will now be described in detail by way of example and with reference to the accompanying drawings.

DETAILED DESCRIPTION OF THE PREFERRED EMBODIMENTS

Figure 1:
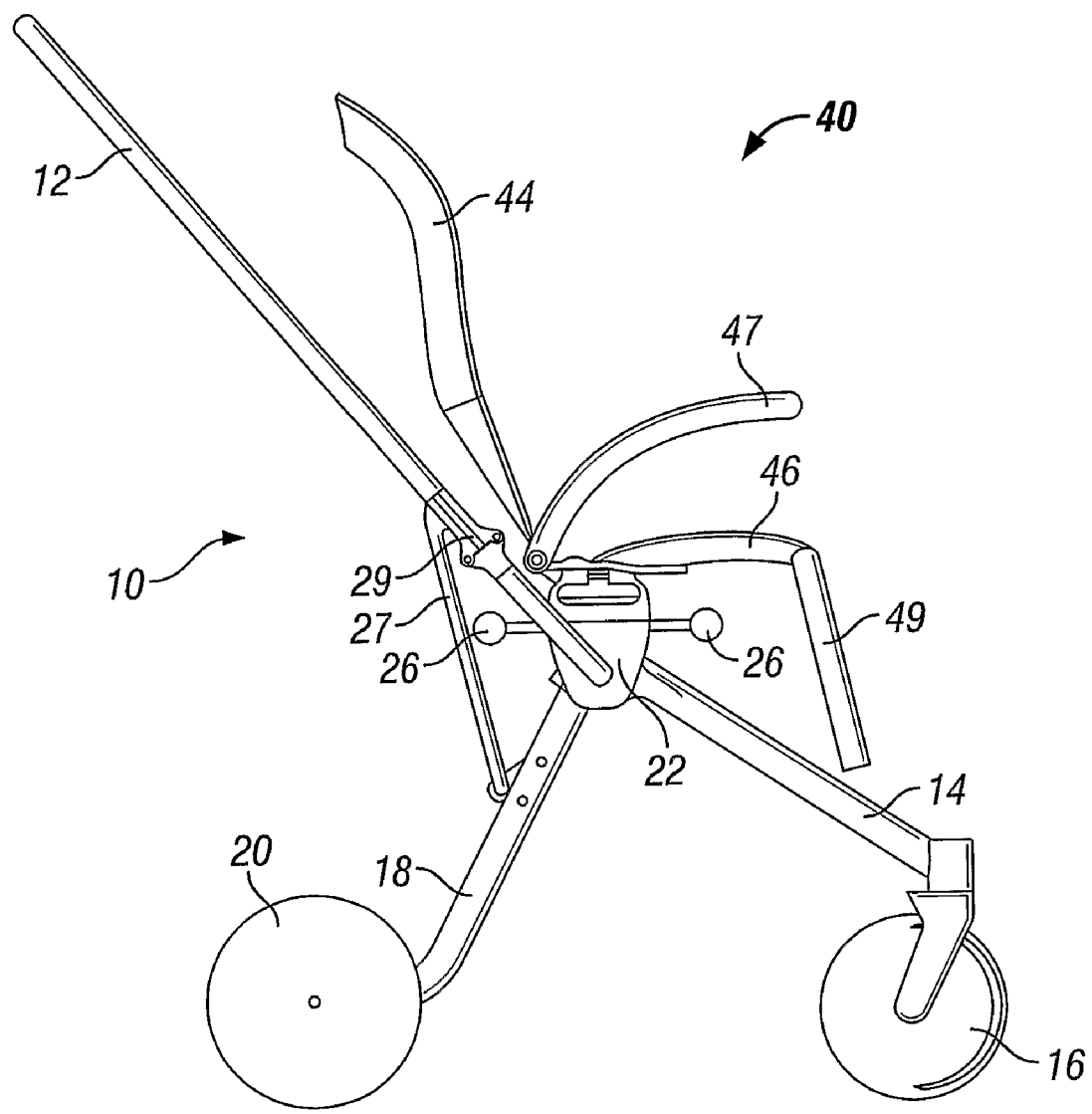
FIG. 1 is a side view of a pushchair frame according to a first embodiment of the present invention, shown in its operating position with an attached front-facing seat (which does not form part of the present invention)
Figure 2:
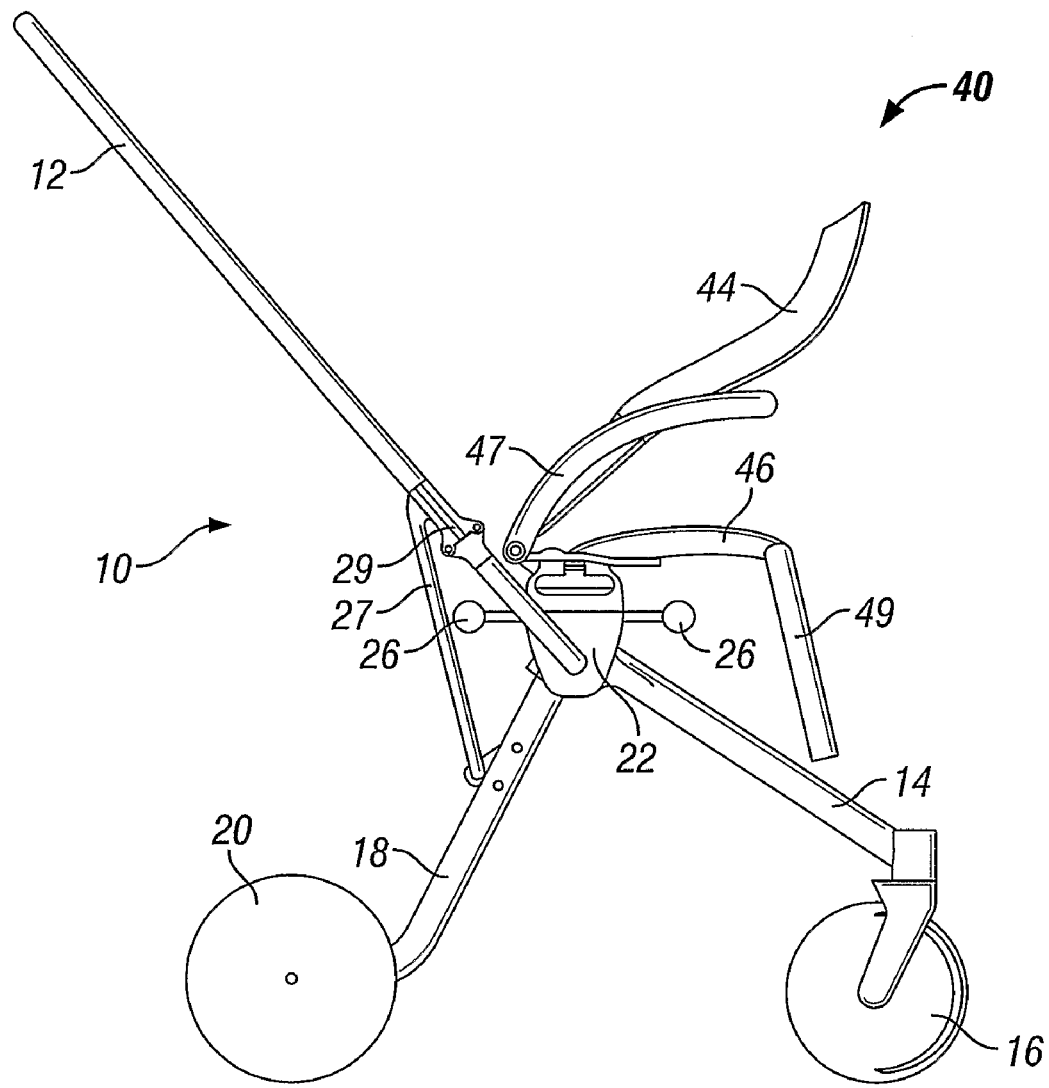
FIGS. 2 & 3 are respective side views of the pushchair frame of the preceding figure showing different stages of folding between operating and stowed positions.

Referring to FIG. 1, there is illustrated a pushchair frame 10 according to an embodiment of the present invention, showing the frame 10 with an attached front-facing seat 40 by way of example. It is to be understood that the seat does not form part of the present embodiment and is included only for purposes of illustration.

The pushchair frame 10 comprises a push/pull handle 12, a front wheel frame 14 on which a pair of front wheels 16 are rotatably mounted, a rear wheel frame 18 on which a pair of rear wheels 20 are rotatably mounted, a seat mounting yoke/hub 22, retaining means (discussed below), a pair of carrying handles 26, and a link member 27.

Figure 5:
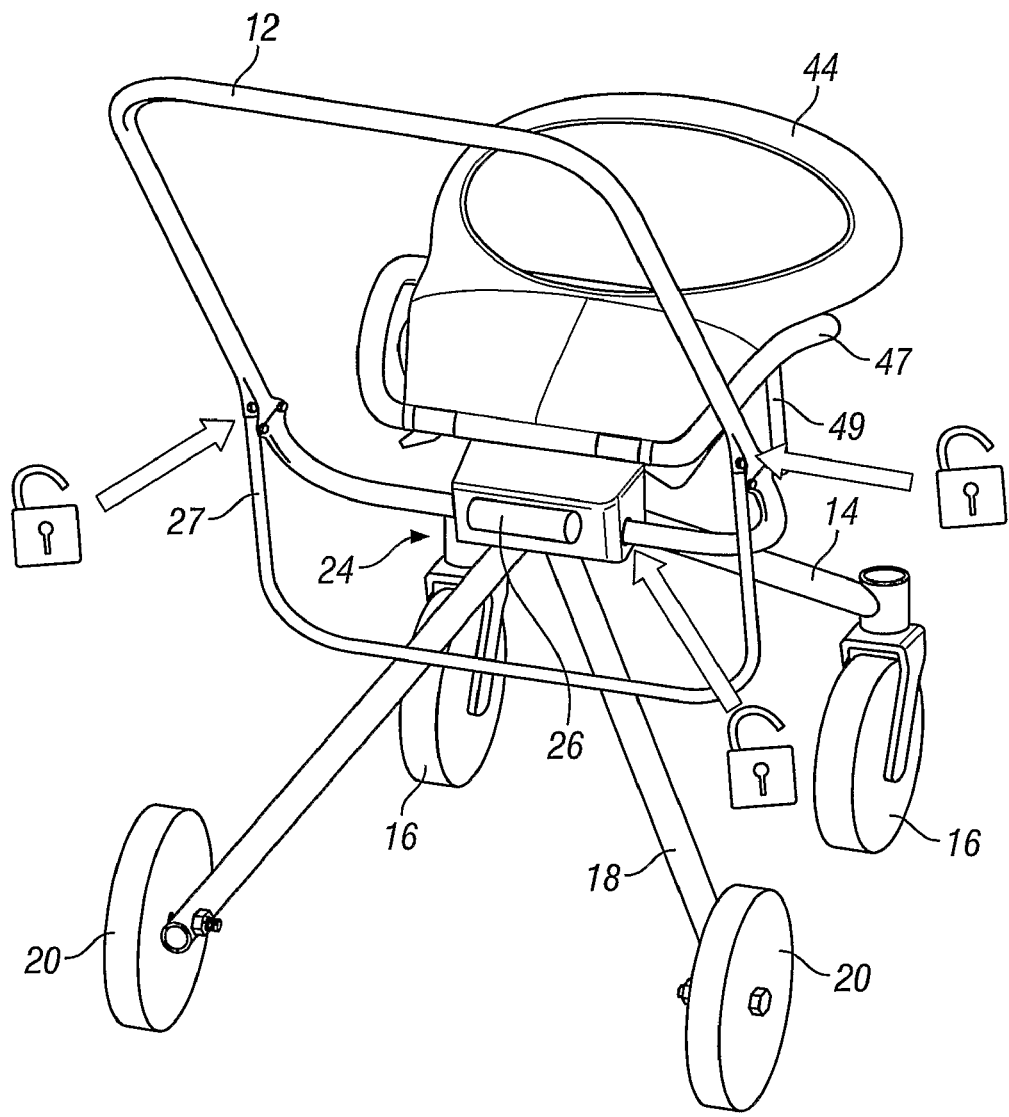
FIG. 5 is a perspective view from behind and to one side of the pushchair frame of FIG. 1 showing example locking locations on the frame.
Figure 12A:
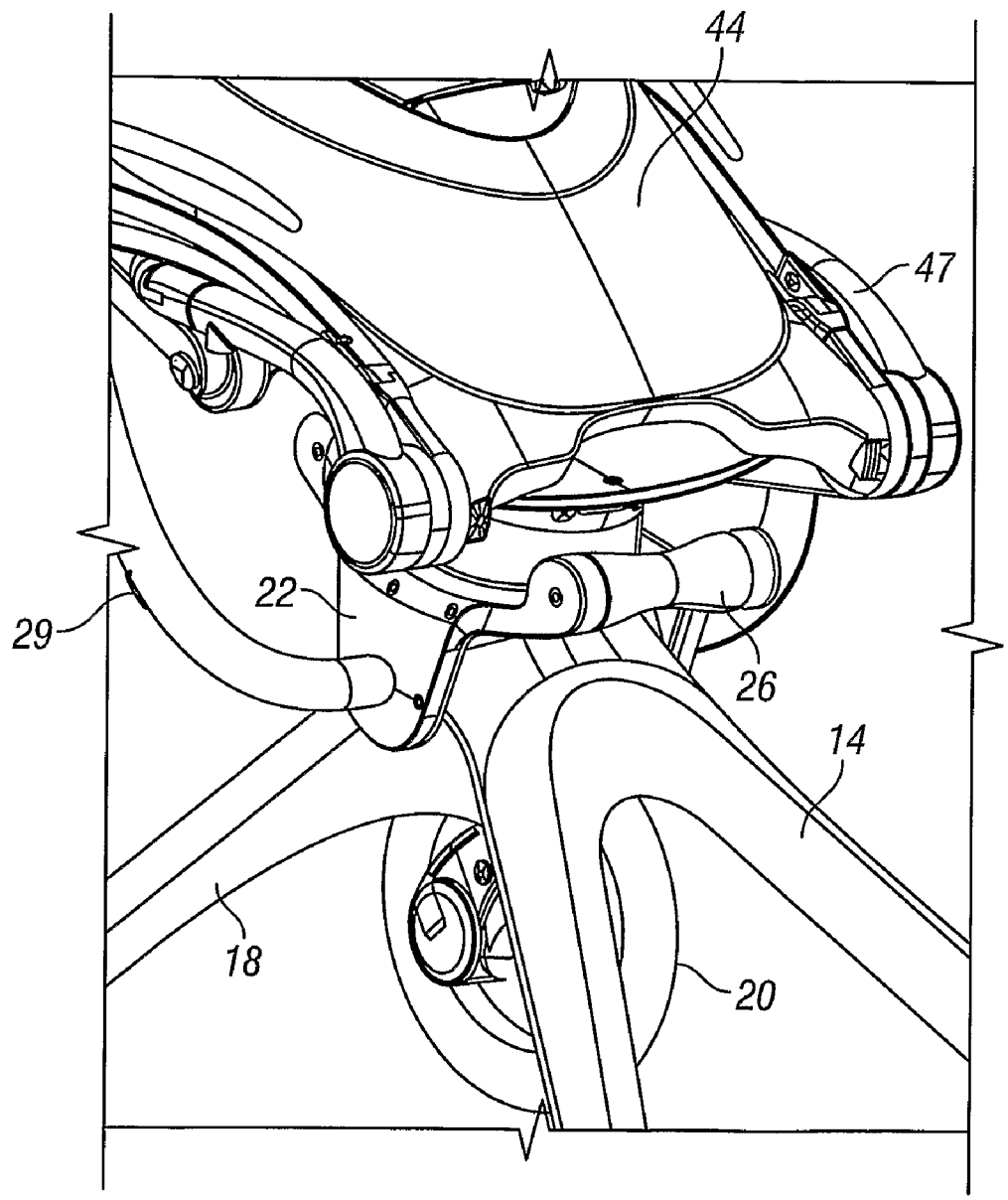
FIG. 12a is a perspective view from the front and to one side of part of the pushchair frame of FIG. 10 showing an example carrying handle.

The front and rear wheel frames 14, 18 are both fork-like structures, with each frame corresponding generally to an inverted 'V-shape' support (as shown in FIGS. 5 and 12). The frames 14, 18 are fabricated from a tubular material, such as steel piping, and each frame is pivotably coupled to the yoke 22 towards the apex of the inverted 'V'. The wheels 16 and 20 are of a conventional type, with those of the rear wheel frame 18 being slightly larger in diameter than the wheels 16 of the front wheel frame 14.

As illustrated in the figures, the pair of wheels 16 on the front wheel frame 14 are of a pivoting 'castor' type to improve the manoeuvrability of the pushchair 10, as known in the art. The rear wheels 20 can also be fitted with lockable brakes (not shown) to selectively prevent movement of the pushchair at times when it is desired to keep the pushchair stationary.

It is to be appreciated that any suitable form of wheel, or number thereof, may be used in conjunction with the pushchair frame of the present invention. Moreover, references herein to "wheel" or "wheels" are to be taken to also include rotatable balls, caterpillar track arrangements or any other means by which the pushchair can achieve translational motion relative to the ground, or any combination of the above.

Figure 7:
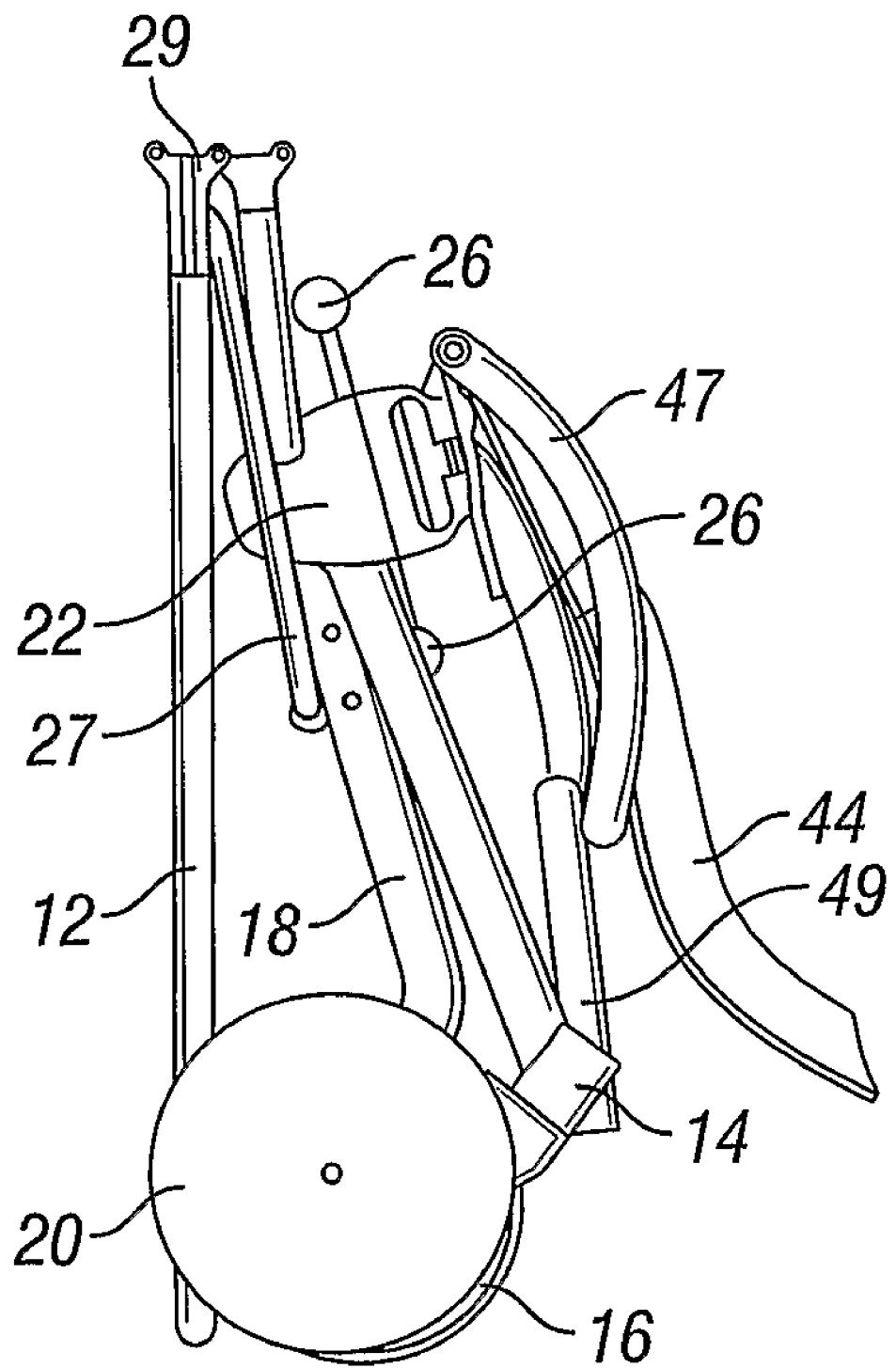
FIG. 7 is a side view of the pushchair frame of the preceding figures shown in an example stowed position.
Figure 14:
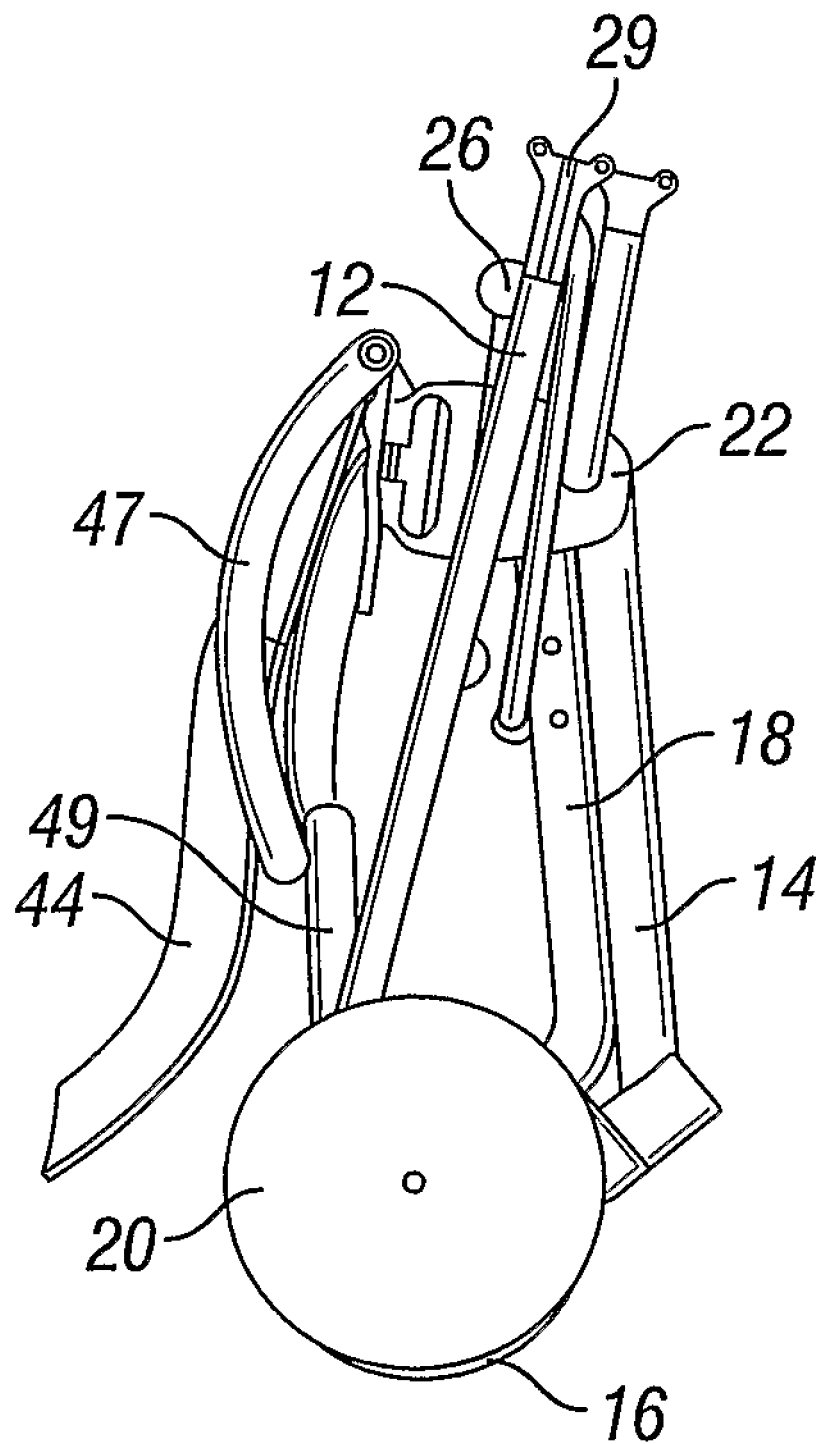
FIG. 14 is a side view of the pushchair frame of FIG. 10 shown in an example stowed position.

The seat mounting yoke 22 forms a central hub to the frame 10, and is rotatable relative to both the front wheel 14 and the rear wheel frame 18. This functionality permits the yoke 22 to be advantageously rotated into one of two different stowed positions—either a front stowed position or a rear stowed position. When the yoke 22 is rotated into the front stowed position it is generally adjacent to the front wheel frame 14 (as best shown in FIG. 7) and when it is rotated into the rear stowed position it is generally adjacent to the rear wheel frame 18 (as best shown in FIG. 14).

During normal operation of the pushchair (i.e. when it is not folded), the yoke 22 and front and rear wheel frames 14, 18 are maintained in position by way of the retaining means. In one embodiment, the retaining means comprise a releasable locking mechanism 34, 35 (as shown in FIGS. 19 & 20) integral to the yoke 22. Actuation means 28 (shown in FIGS. 4a & 4b) are mounted on each of the carrying handles 26, and are configured to be connected to the locking mechanism by way of a mechanical linkage.

Figure 12B:
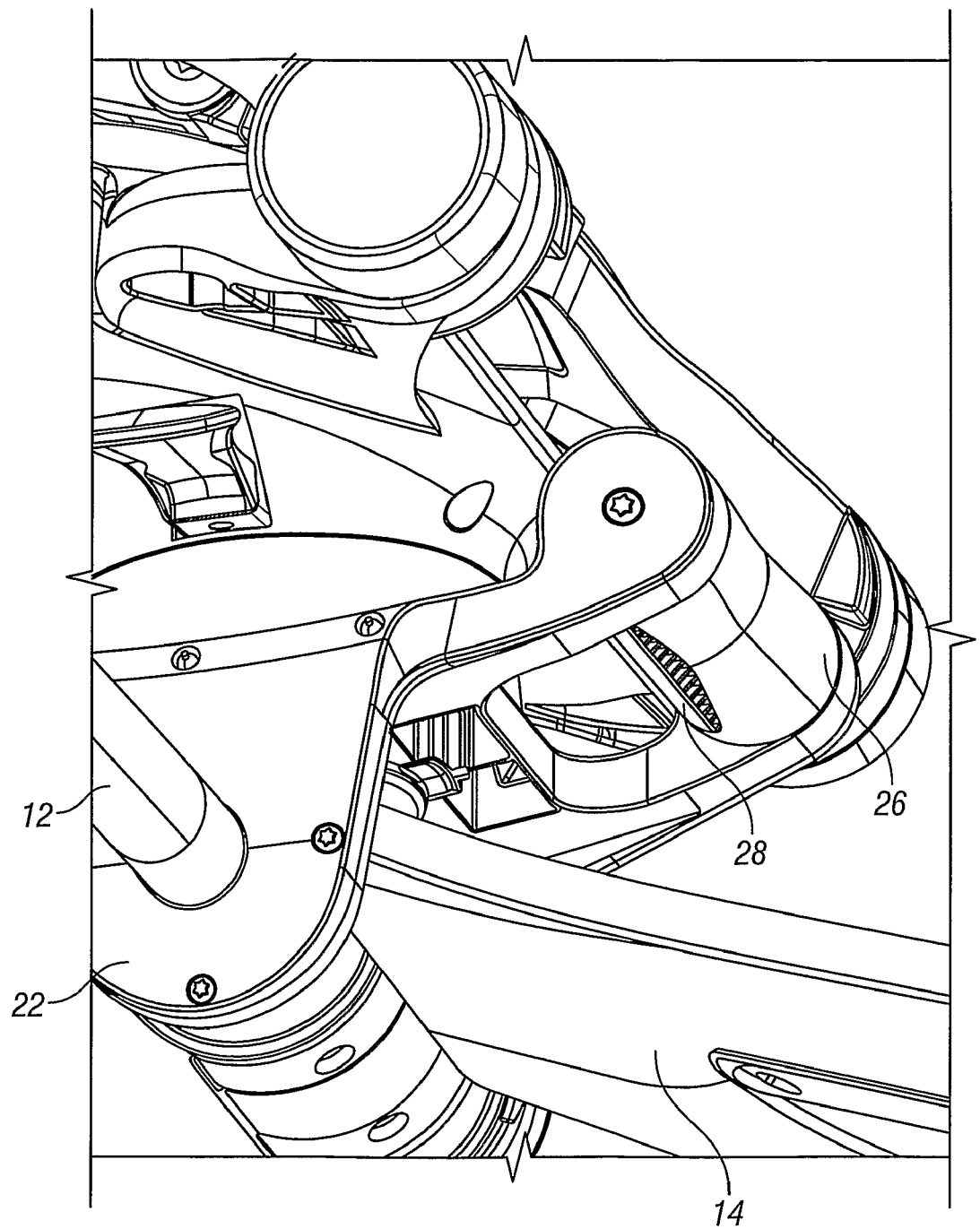
FIG. 12b is a perspective view of the carrying handle of the preceding figure, showing an example actuation means.

As shown in FIG. 1, the pair of carrying handles 26 are disposed on the yoke 22, one on the front face and the other, oppositely disposed, on the rear face. The function of the handles 26 is to facilitate operation and manipulation of the pushchair frame 10 during folding and subsequent unfolding of the frame, and to allow the frame to be conveniently lifted and carried while it is folded. The actuation means 28 comprise an elongate depressible pad, which is incorporated into a rotatable grip forming part of each carrying handle 26, as shown in FIGS. 4b and 12b, respectively.

The actuation means 28 are connected to the releasable locking mechanism in the yoke 22 by way of a cable (not shown) that passes through each carrying handle 26. Depressing one or both of the pads 28 and twisting the respective grip, releases the lock on the yoke 22 and allows the yoke 22 and the front and rear wheel frames 14, 18 to be folded, thereby collapsing the pushchair frame (as discussed in more detail below).

Referring again to FIG. 1, the push/pull handle 12 comprises two sections: an upper part adapted to be manually gripped by a user and a lower part fixedly coupled to the yoke 22. The upper and lower parts are coupled together by way of hinge means 29 that are configured to enable the handle 12 to be folded at the time the yoke is unlocked, to thereby minimise the overall size of the collapsed pushchair frame 10. In this way, the resulting folded pushchair may then be more easily manoeuvred into a vehicle or onto public transport.

As best shown in FIG. 5, the push/pull handle 12 has a rectangular hoop-like structure made from hollow tubing, with the hinge means 29 being positioned so as to define the upper part as the larger section of the hoop relative to the lower part. The hinge means 29 comprise a pair of lockable hinge joints 29, one on each side of the handle 12, that are coupled to the actuation means 28 on each of the carrying handles 26 by way of cables threaded internally through the lower part of the handle 12.

Applying a press and twist action to one or both of the actuation means 28 on handles 26, not only releases the lock on the yoke 22, but also unlocks the pair of hinge joints 29, allowing the frame 10 and push/pull handle 12 to be folded as will be discussed below further in relation to FIGS. 2 to 7 and FIGS. 11 to 14.

To further facilitate manipulation of the pushchair frame 10, the upper part of the push/pull handle 12 is coupled to the rear wheel frame 18 by way of the link member 27, as shown, for example, in FIGS. 1 and 5. The function of the link member 27 is to convert the movement of the upper part of the push/pull handle 12 into a related pivoting movement of the rear wheel frame 18. In this way, the frame 10 can be easily unfolded, as movement of the upper part of the push/pull handle 12 can readily pull the rear wheel frame 18 apart from front wheel frame 14 as the parent or carer unfolds the frame.

The link member 27 is tubular in structure and is generally 'U'-shape in form, being pivotably attached to both the upper part of the push/pull handle 12 and the rear wheel frame 18. In the example as shown in FIG. 5, the link member 27 is attached to the rear wheel frame 18 by way of hinge mechanism supported by a short cross-beam integral to frame 18, with each end of the link member 27 being coupled just above a respective one of the hinge joints of the push/pull handle 12.

Referring to FIGS. 2 to 7, the steps involved in collapsing and folding the pushchair of FIG. 1 will be now be described. As mentioned previously, the pushchair of FIG. 1 includes a front-facing seat 40 attached to the seat mounting yoke 22 of frame 10. The seat 40 is shown for description purposes only and does not form part of the present embodiment. However, for reference, the seat is taken to be of a type that includes a seatback 44, a seat base 46, a bumper bar 47 and a footrest 49, and may itself be folded and consequently does not need to be removed prior to collapsing the frame 10.

Figure 3:
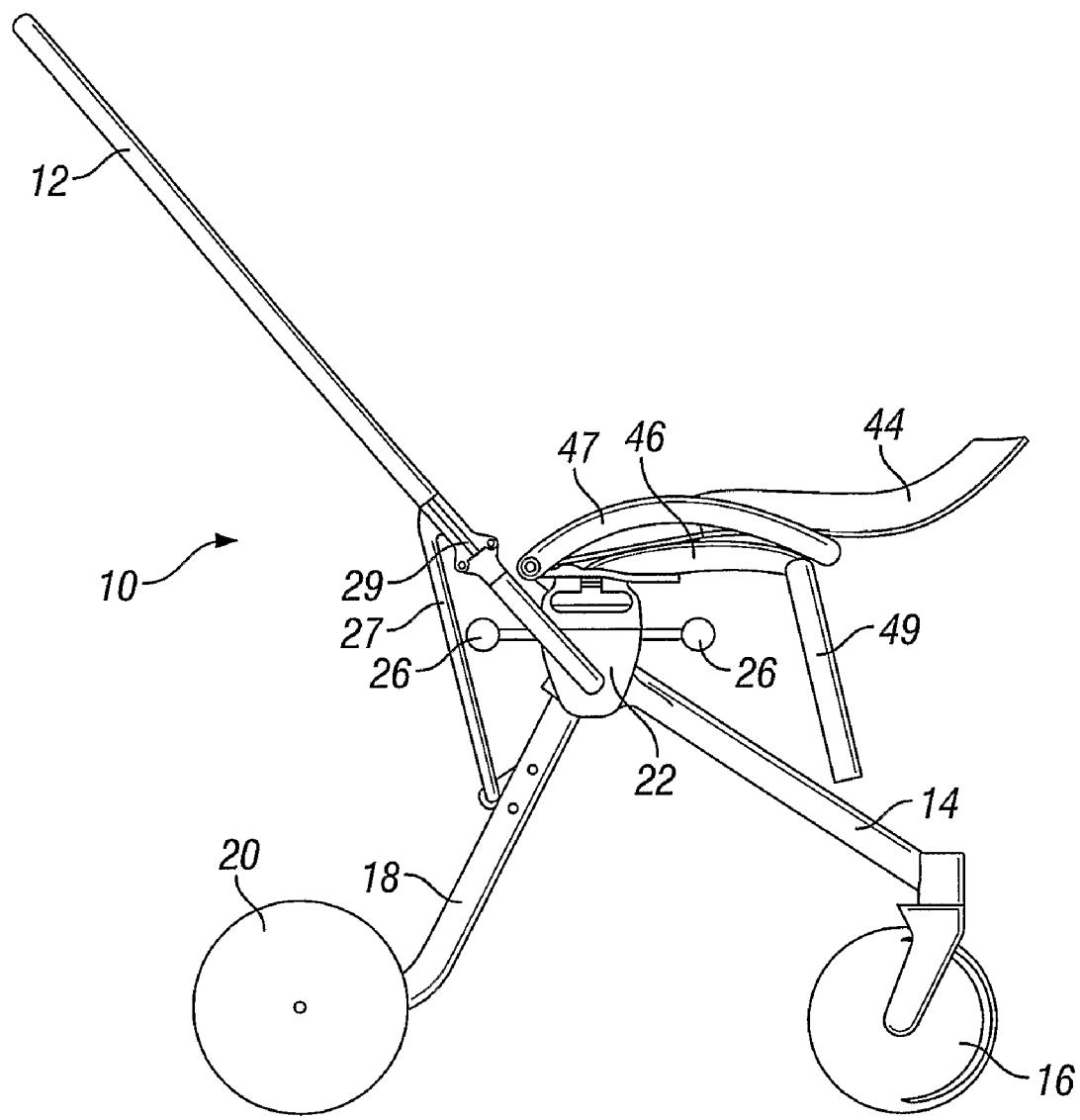

Having removed the child (not shown) from the pushchair 10, a user initially pushes the seat back 44 in a forward direction (i.e. away from the push/pull handle 12) and continues until the bumper bar 47 folds downwardly, such that both the seat back 44 and bumper bar 47 come to rest adjacent to the seat base 46, as shown in FIG. 3. It is noted that some seats require some initial unlocking themselves before the seat back can be folded, so in this example it is assumed that any locks on the seat have already been released.

Figure 4A:
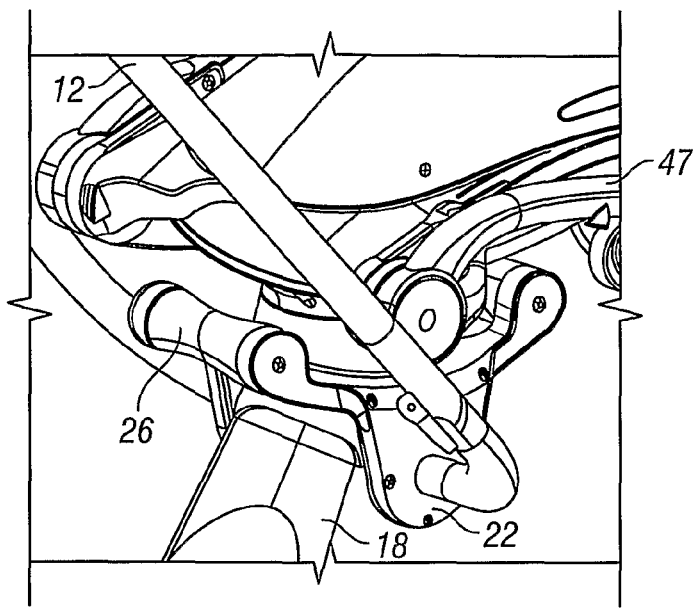
FIG. 4a is a perspective view from behind and to one side of part of the pushchair frame of FIG. 1 showing an example carrying handle.
Figure 4B:
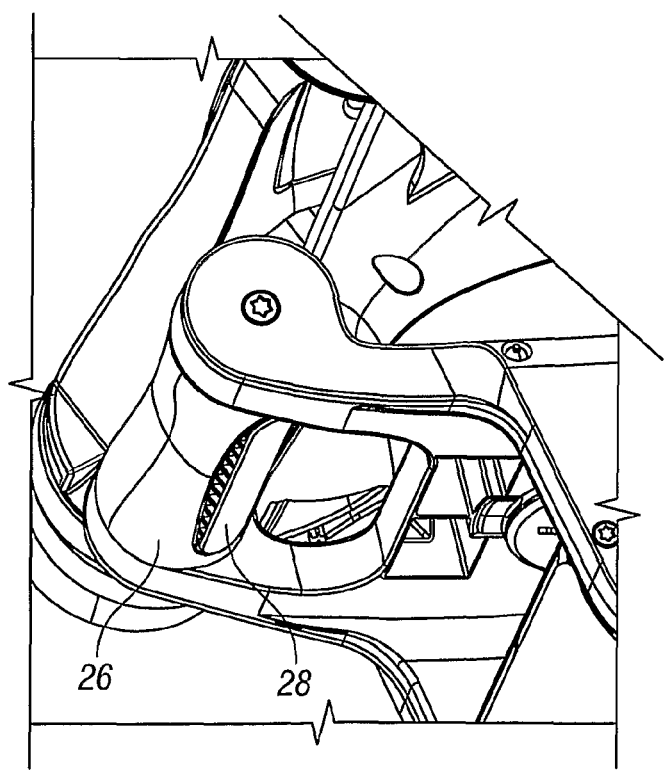
FIG. 4b is a perspective view of the carrying handle of the preceding figure, showing an example actuation means.

The folded seat 40 allows additional access to the carrying handle 26 on the rear face of the yoke 22, as clearly shown in FIGS. 4a and 4b. The carrying handle 26 includes an elongate depressible pad 28 mounted on a rotatable grip, which when depressed and twisted by the user results in the yoke 22 and the front and rear wheel frames 14, 18 becoming unlocked by virtue of releasing the locking mechanism within the yoke 22 (as shown symbolically by the lock icons in FIG. 5). Depressing the pad 28 and twisting the grip also causes the pair of hinge joints 29 on the push/pull handle 12 to be unlocked, which allows the upper part of the handle 12 to be folded as the frame is collapsed.

Figure 6:
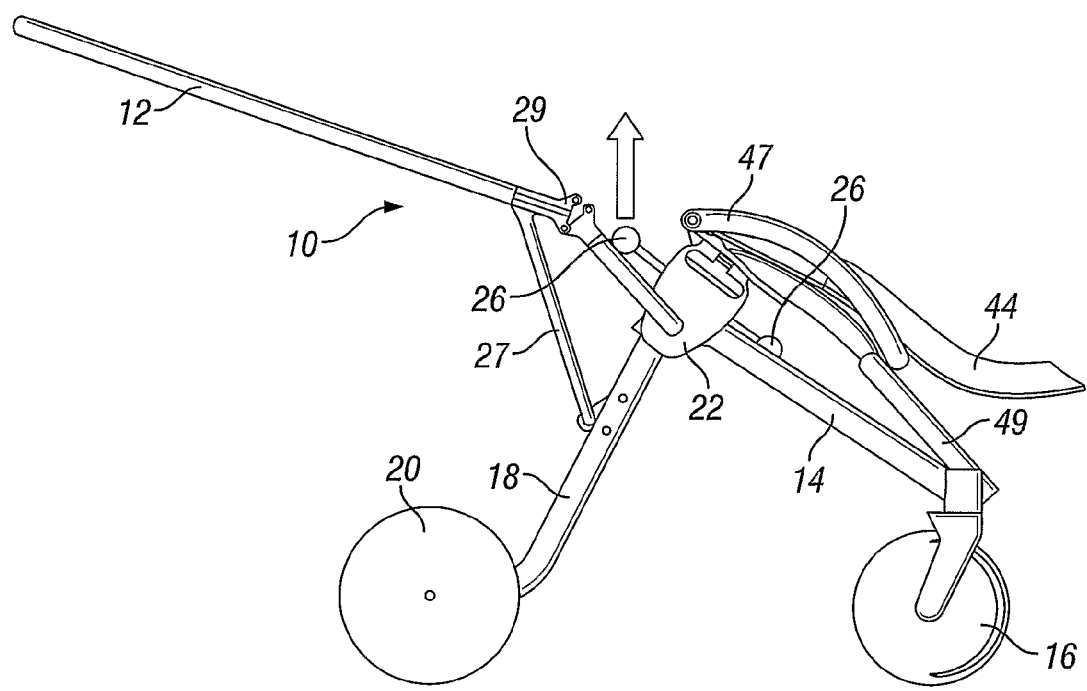
FIG. 6 is a side view of the pushchair frame of the preceding figures shown after unlocking and during folding.

To facilitate folding of the frame 10, the user grips the carrying handle 26 and applies an upward (lifting) force to the frame 10, as shown by the arrow in FIG. 6. The lifting force need not be sufficient to lift the pushchair completely from the ground, but instead be merely adequate to promote folding of the frame partly under action of its own weight. As the yoke 22 is now unlocked it is free to rotate relative to the front and rear wheel frames 14, 18, which due to the lifting force on the rear carrying handle 26 causes the yoke 22 to forwardly rotate so that it becomes generally adjacent to the front wheel frame 14, as illustrated in FIG. 6. As this occurs, the footrest 49 of the seat 40 folds against the front wheel frame 14, completing the folding of the seat 40.

As the user continues to apply the lifting force, the rear wheel frame 18 is free to pivot about the yoke 22, which gradually results in the wheel frames 14, 18 moving towards each other. This action allows the push-pull handle 12, which is now able to pivot about the hinge joints 29, to fold downwardly as the rear wheel frame 18 moves towards the front wheel frame 14.

Once the pushchair frame 10 is fully folded (when the front and rear wheel frames 14, 18 are generally adjacent one another), the user can release the carrying handle 26 and secure the collapsed frame by way of a clip (not shown) located close to the rear wheels 20. Therefore, as illustrated in FIG. 7, the pushchair frame 10 can be placed into a front stowed position when a front-facing seat 40 is attached to the yoke 22, or otherwise, as and when, optionally required.

Hence, it is evident that the pushchair frame 10 of the present invention may therefore be easily and conveniently collapsed mostly, or if not completely, by way of a single-handed operation, thereby overcoming some or all of the problems in the prior art and consequently reducing difficulty for the user.

Figure 8:
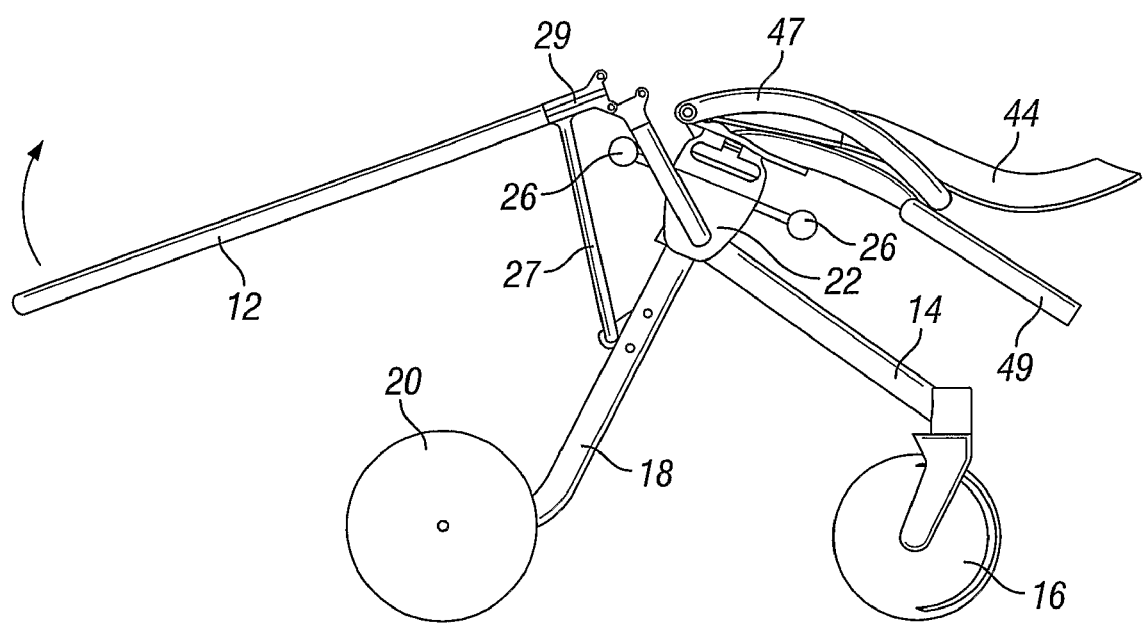
FIGS. 8 & 9 are respective side views of the pushchair frame of the preceding figures shown during different stages of unfolding between stowed and operating positions.

At a subsequent time when the user requires the pushchair for normal use, he/she lifts the push/pull handle 12, which in turn causes the rear wheel frame 18 to move apart from the front wheel frame 14 by action of the link member 27, as illustrated in FIG. 8. As the user continues to lift the push/pull handle 12 the yoke 22 gradually retains its "upright" position and the front and rear wheel frames 14, 18 pivot into their spaced apart operating position. The yoke 22 automatically rights itself by way of a self-righting mechanism, which is described in more detail below.

Figure 9:
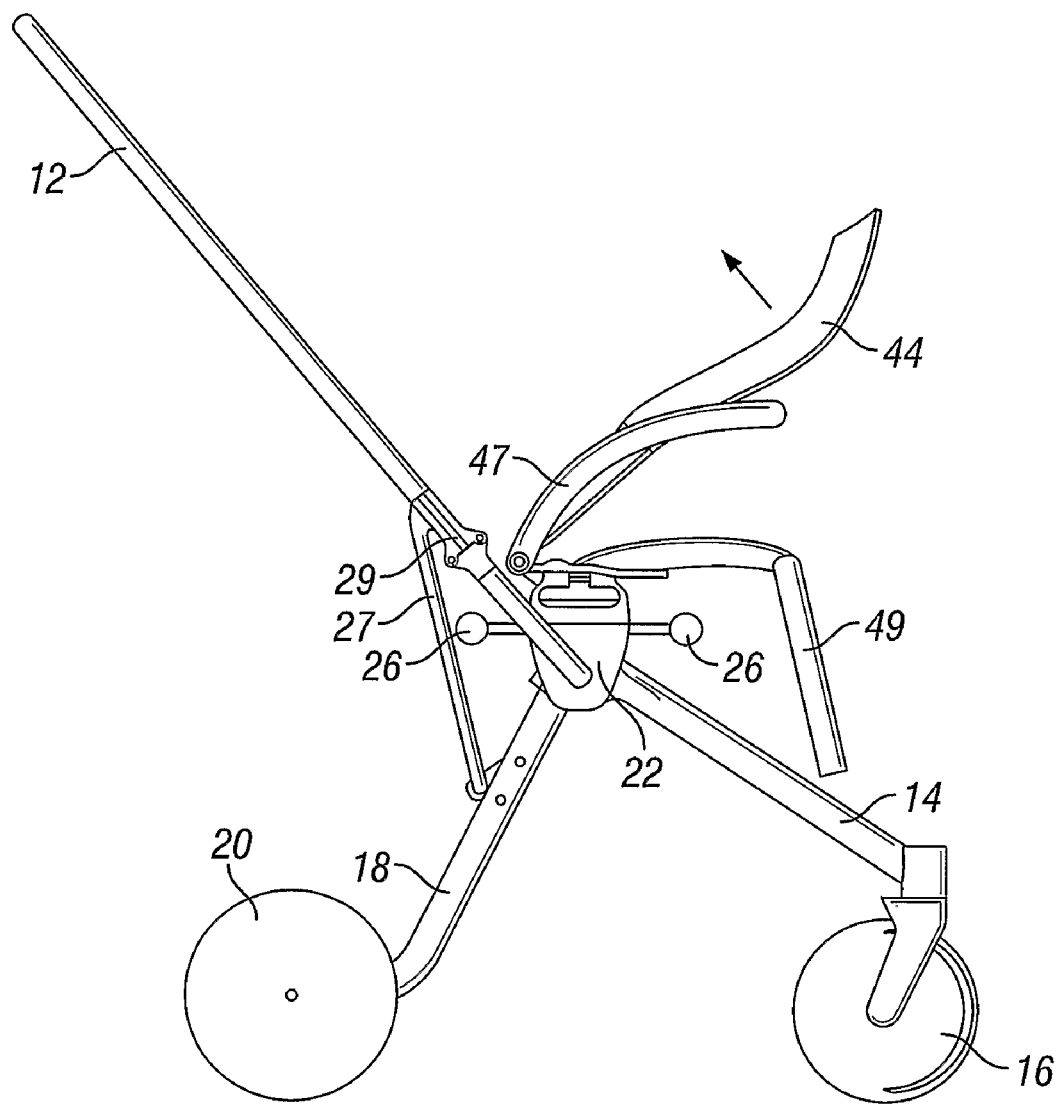

Once the pushchair frame 10 is fully unfolded (as shown in FIG. 9), the self-righting mechanism enables the releasable locking mechanism to automatically engage, to thereby once more lock the yoke 22, front and rear wheel frames 14, 18 and push/pull handle 12 into their operating positions. All that remains is for the seat 40 to be unfolded, as illustrated in FIG. 9, and the pushchair is then ready for use again as shown in FIG. 1.

Referring now to FIGS. 10 to 14, there is shown a corresponding embodiment in which the pushchair frame 10 of FIG. 1 is being used in conjunction with a rear-facing seat 40. The rear-facing seat 40 has the same features and functionality as the seat in the preceding example, but is instead mounted to the yoke 22 so that the child faces the user during normal use of the pushchair.

Figure 10:
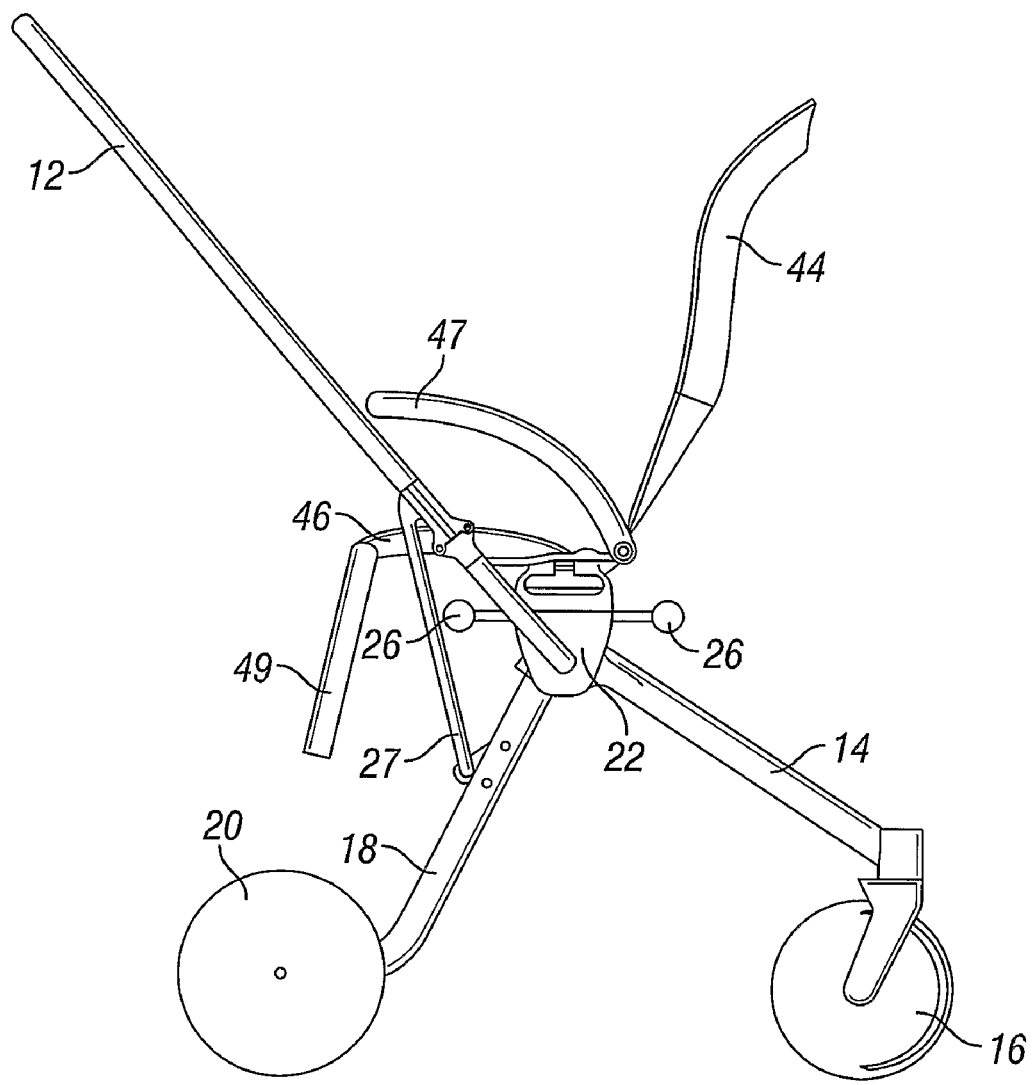
FIG. 10 is a side view of the pushchair frame of the preceding figures, shown in its operating position with an attached rear-facing seat (which does not form part of the present invention)
Figure 11:
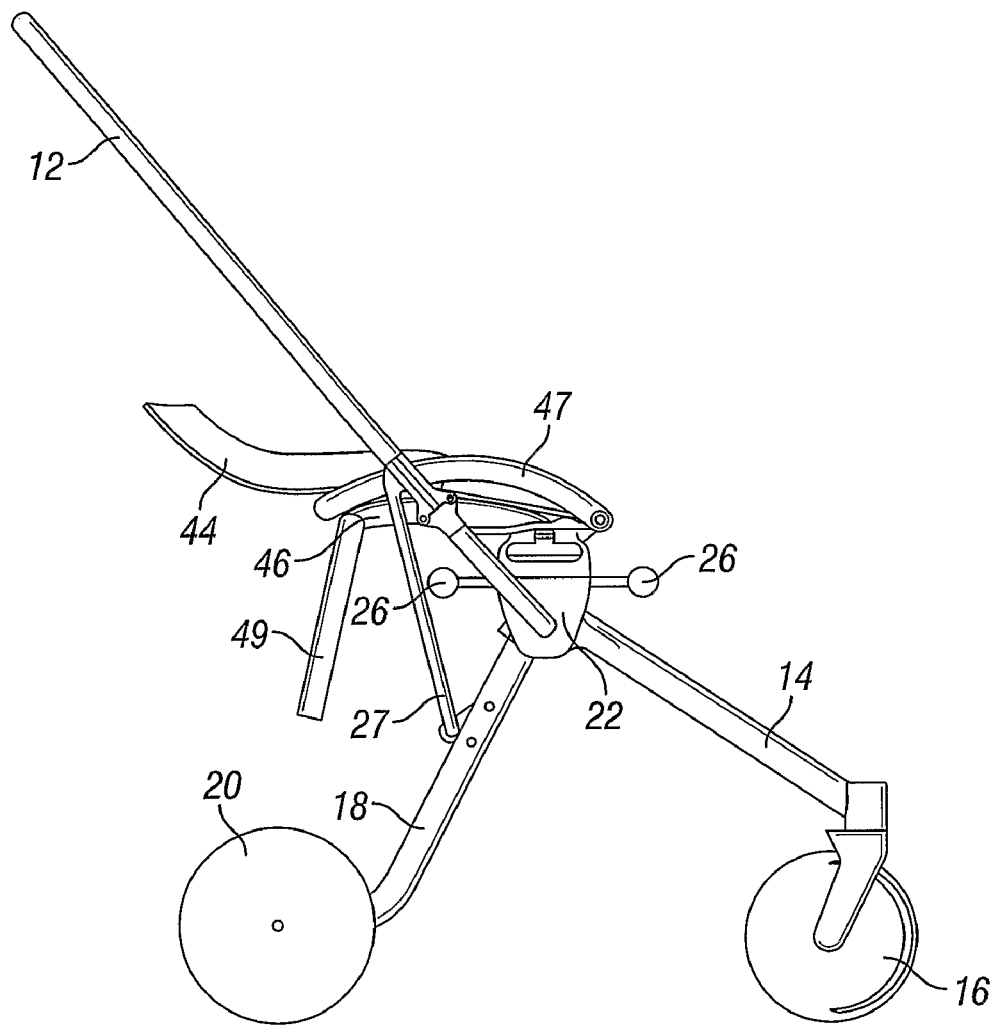
FIG. 11 is a side view of the pushchair frame of FIG. 10 shown during initial folding.

To collapse the pushchair frame 10 of FIG. 10, the user folds the seat back 44 and bumper bar 47 until they are both generally adjacent to the seat base 46, as shown in FIG. 11. The folded seat 40, provides additional access to the carrying handle 26 on the front face of the yoke 22, as illustrated by FIG. 12 and the insert thereto. Depressing the elongate depressible pad 28 on the carrying handle 26 and twisting the grip, thereby unlocks the yoke 22, the front and rear wheel frames 14, 18 and the push/pull handle 12 in the same manner as in the preceding example.

Figure 13:
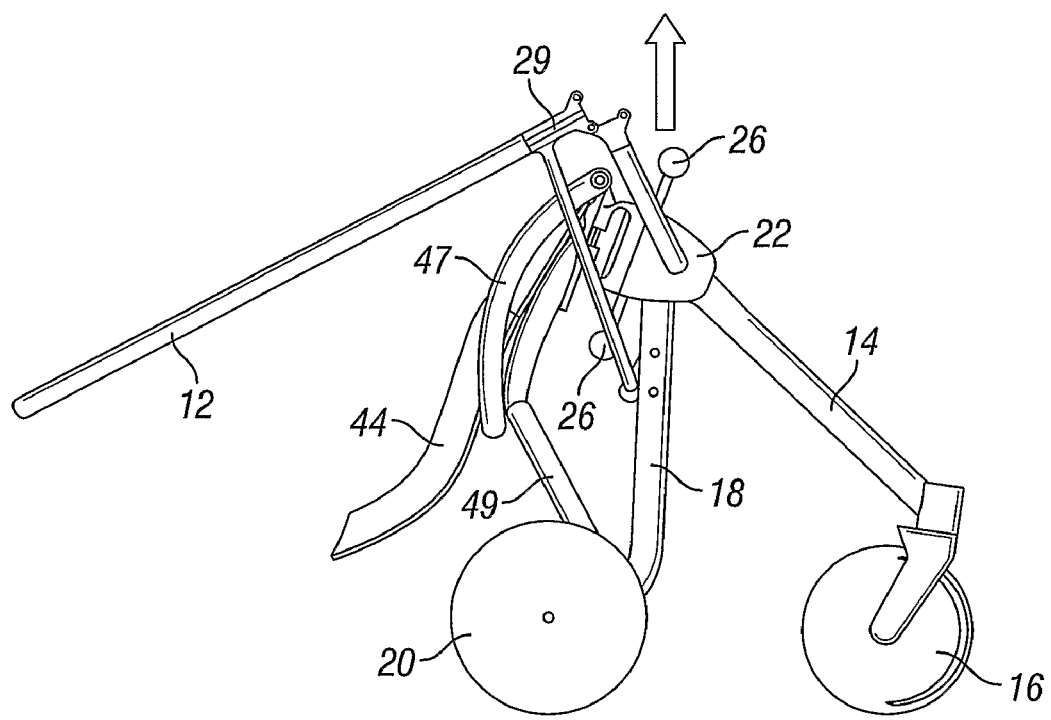
FIG. 13 is a side view of the pushchair frame of FIG. 10 shown during an advanced stage of folding.

The user then grips the carrying handle 26 and applies a lifting force to the handle, as shown in FIG. 13, which causes the yoke 22 to freely rotate towards the rear wheel frame 18, as the frame 10 begins to fold. As the frame 10 is lifted and the yoke 22 rotates, the front and rear wheel frames 14, 18 move together causing the upper part of push-pull handle 12 to descend under the action of the link member 27. Continued application of a lifting force to the carrying handle 26 eventually collapses the frame 10, as shown in FIG. 14, at which stage the yoke 22 is generally adjacent to the rear wheel frame 18 and the front and rear wheel frames 14, 18 are generally adjacent to one another. The frame 10 can be secured in this rear stowed position by way of a clip located close to the rear wheels 20.

Figure 15A:
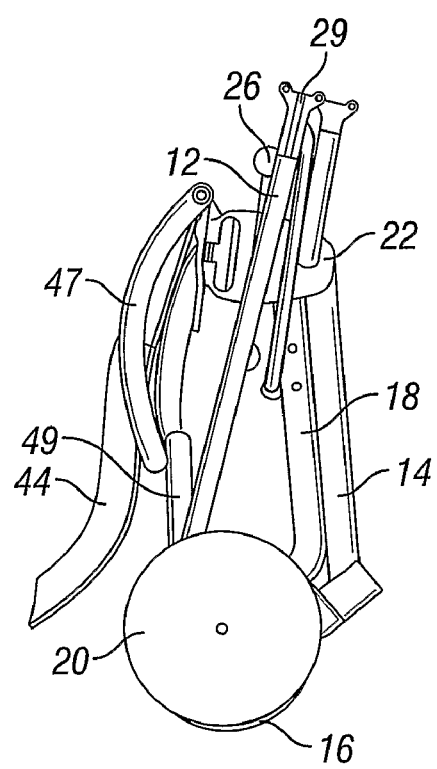
FIGS. 15(a) & 15(b) illustrate side views of the pushchair frame of FIGS. 1 & 10 respectively, shown in example stowed positions.
Figure 15B:
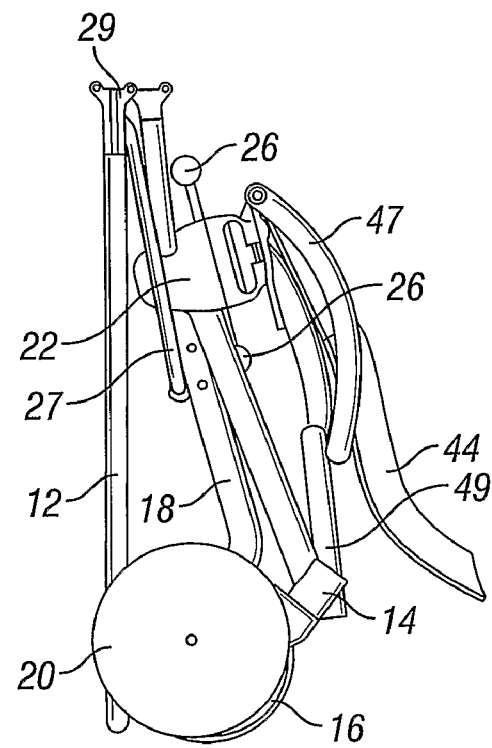

For ease of comparison, FIGS. 15(a) & 15(b) illustrate the pushchair frame of FIGS. 1 and 10 in the rear and front stowed positions respectively. Hence, it is evident that the pushchair frame of the present invention can be folded independent of the seat configuration (e.g. front or rear facing) and therefore can be significantly reduced in size without any need to remove the seat prior to folding. In this way, the ease of use of the pushchair by a parent or carer is found to be greatly improved, while also providing marked advantages in manoeuvrability and convenience of transport as a result of the low 'folded footprint'.

The folded pushchair frame 10 of FIG. 14 can be unfolded in the same manner as for the preceding example and therefore for brevity the steps involved are not repeated.

Figure 16:
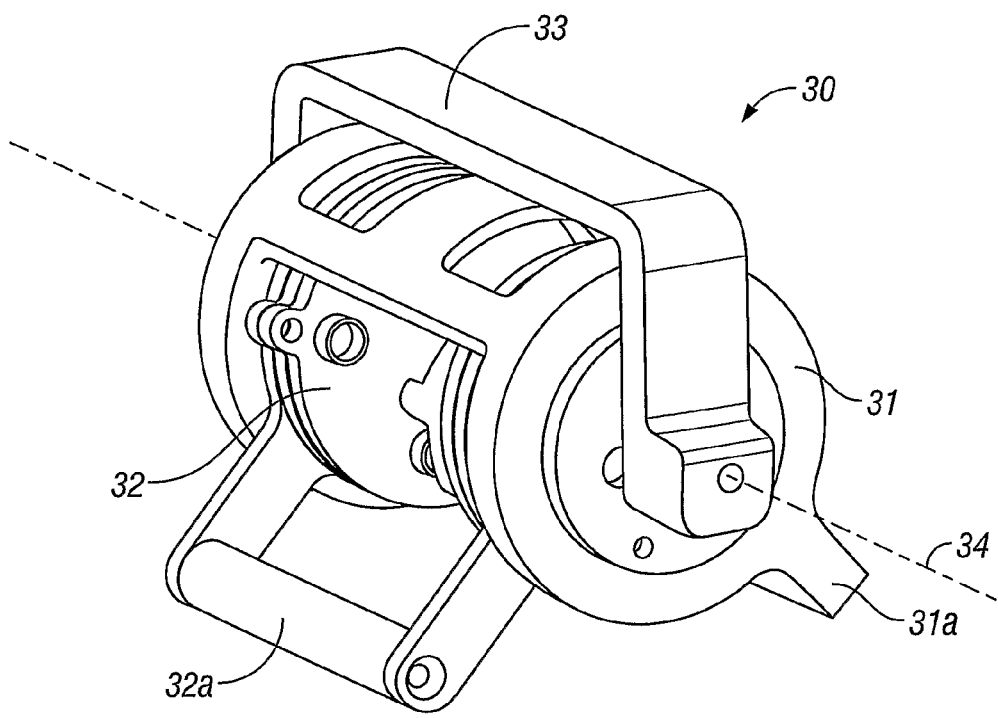
FIG. 16 is a perspective view from the end and to one side of an example self-righting mechanism for use with the pushchair frame of the present invention.

Referring now to FIGS. 16 to 20(a)-(d), there is shown an example of the internal mechanical components of a seat mounting yoke 22 comprising a self-righting mechanism 30 that may be used with any of the embodiments of the present invention. As shown in FIG. 16, the yoke 22 comprises three main components: a front rotatable hinge 31, a rear rotatable hinge 32 and a seat attachment bracket 33. The front rotatable hinge 31 has a generally open cylindrical structure within which the rear rotatable hinge 32 resides. The front and rear rotatable hinges 31, 32 are co-axially aligned so that each is able to rotate about a common axis 34, defined by the longitudinal axis of the open cylindrical structure. The seat attachment bracket 33 is located externally to both the front and rear rotatable hinges 31, 32, as shown in FIG. 16, and is configured to hold the components of the yoke together, while also itself being able to rotate about the common axis 34.

Figure 18:
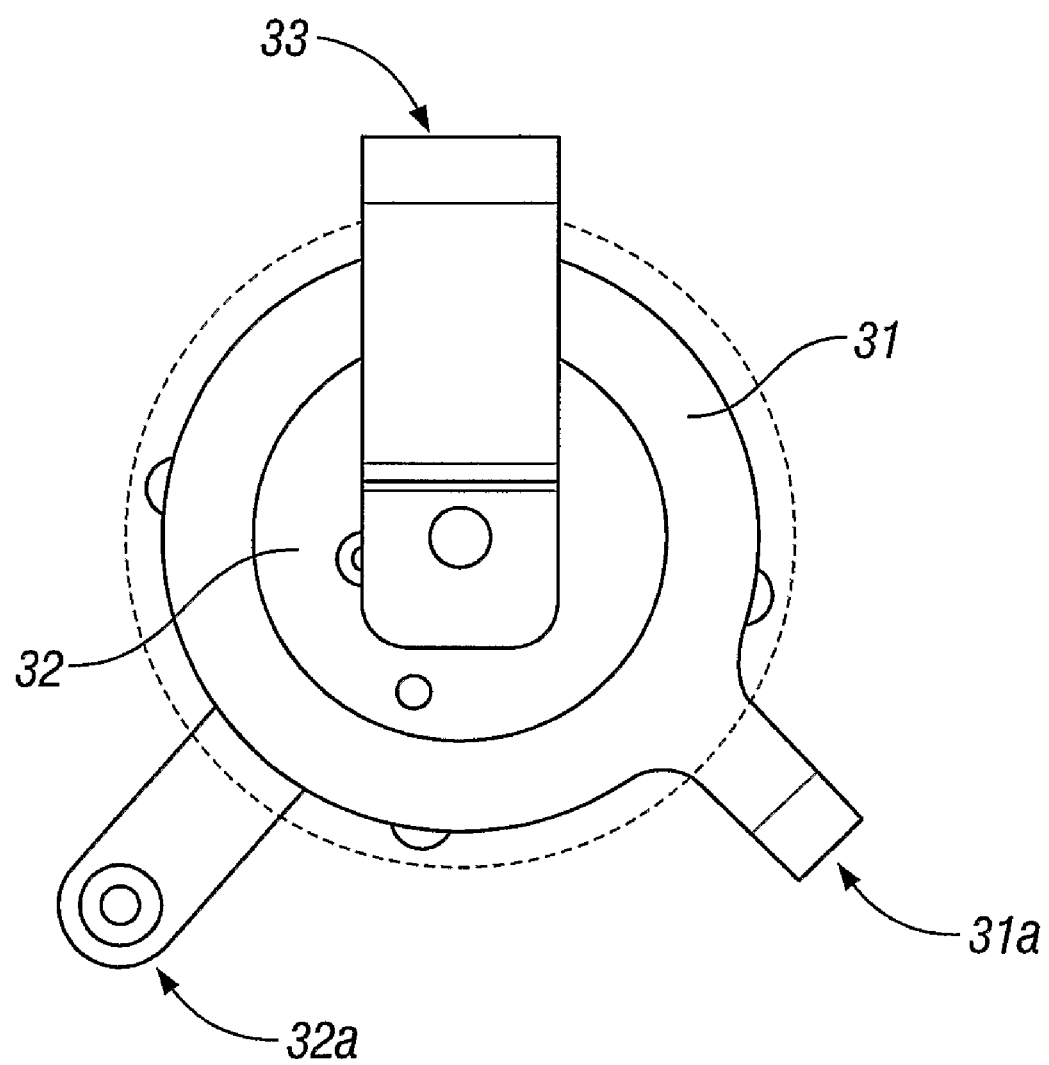
FIG. 18 is a view of one end of the self-righting mechanism of FIGS. 16 & 17.

As shown in FIGS. 16 and 18, the front rotatable hinge 31 includes a protruding coupling 31a that is adapted to be mechanically connected to the front wheel frame 14 of the pushchair frame 10. In like manner, the rear rotatable hinge 32 includes a corresponding protruding coupling 32a that is adapted to be mechanically connected to the rear wheel frame 18. The seat attachment bracket 33 serves as a support for a suitable seat attachment mechanism, or alternatively, can be configured to directly receive a pushchair seat by incorporating an integral clamp, latch or one or more pre-drilled holes etc.

It is noted that the features of the front and rear wheel frames and pushchair seat have been omitted from FIGS. 16 to 22 for clarity of presentation. However, in the following description reference will be made to a fully assembled and operational pushchair frame according to the present invention.

Figure 17:
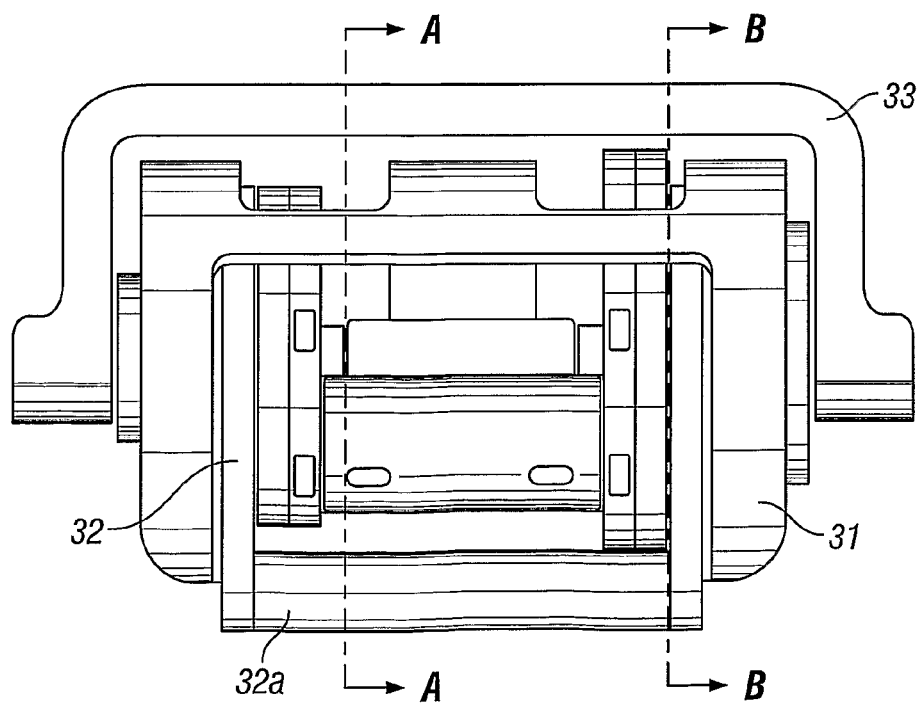
FIG. 17 is a side view of the self-righting mechanism of FIG. 16.

In the example of FIG. 17, the front and rear rotatable hinges 31, 32 are mechanically coupled together by way of a planetary gear box arrangement having an integral locking mechanism (discussed below) that is configured to lock each of the front and rear rotatable hinges 31, 32 and the seat attachment bracket 33 in place. Referring now to FIGS. 19(a) to 19(d), there are shown cross-sectional views of the planetary gear box arrangement taken along line A-A in FIG. 17.

Figure 19A:
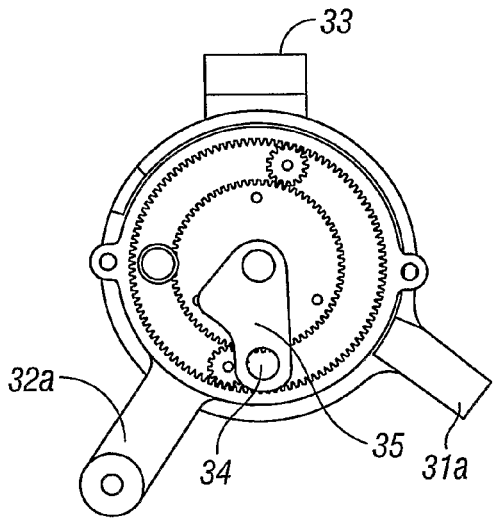
FIGS. 19(a) to 19(d) are cross-sectional views of the self-righting mechanism taken along line B-B of FIG. 17.
Figure 19B:
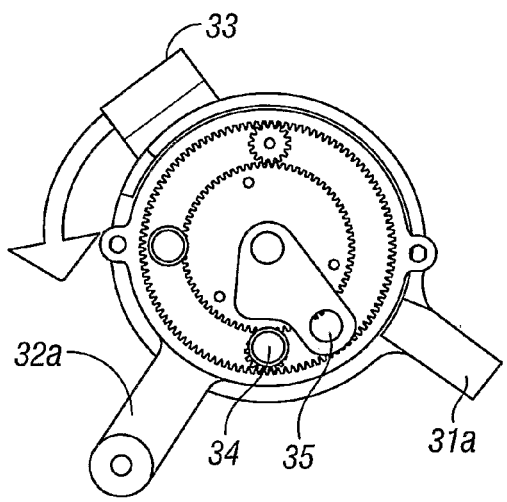
Figure 19C:
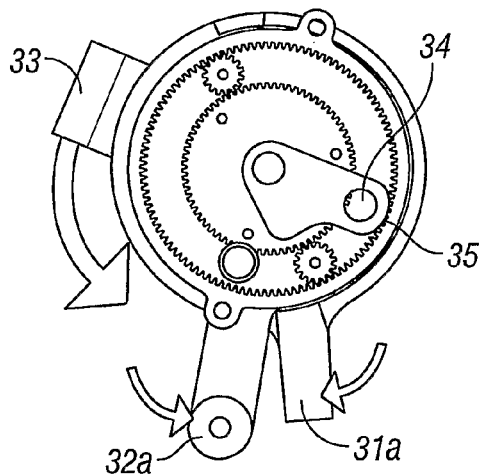
Figure 19D:
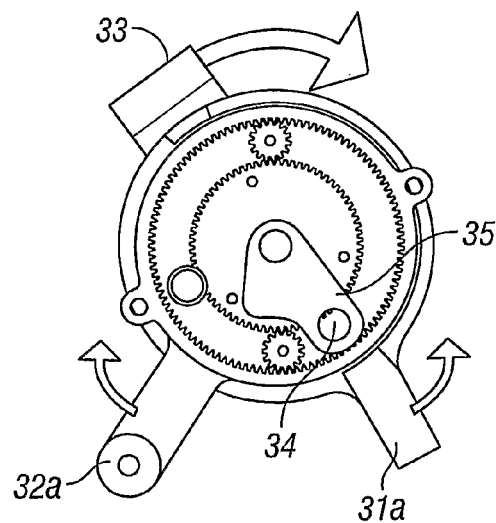
Figure 20A:
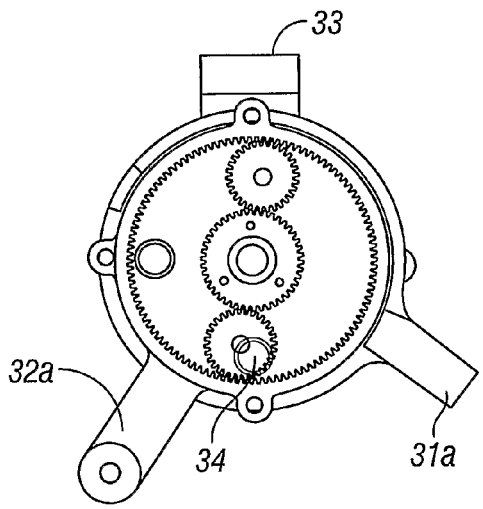
FIGS. 20(a) to 20(d) are cross-sectional views of the self-righting mechanism taken along line A-A of FIG. 17.
Figure 20B:
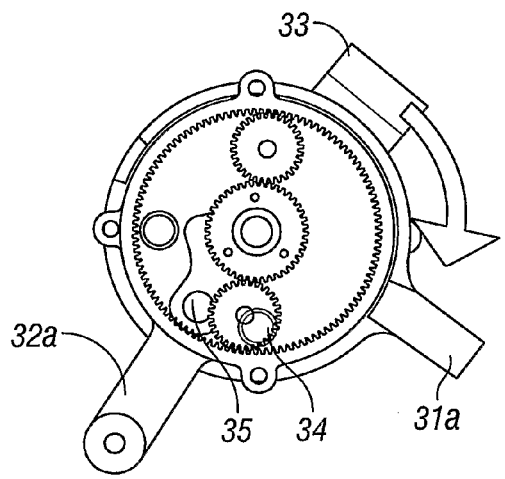
Figure 20C:
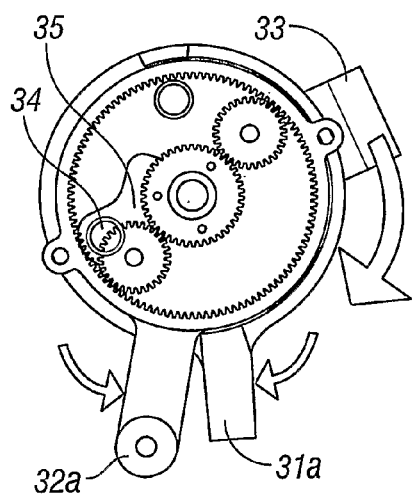
Figure 20D:
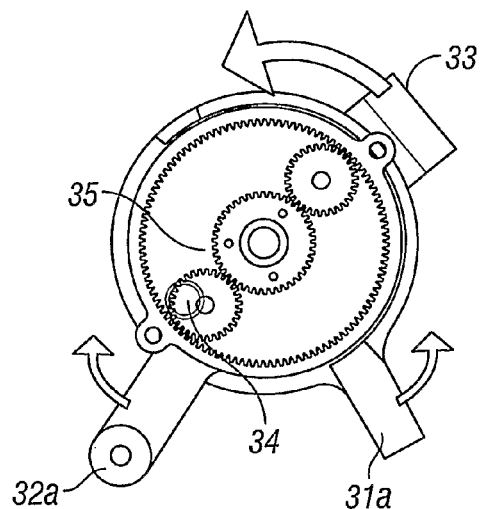

In FIG. 19(a), the seat attachment bracket 33 and front and rear rotatable hinges 31, 32 are locked in position by way of a locking mechanism comprising a spring-loaded pin 34 that engages with a pivotable elongate latch 35. In this configuration, the pushchair frame 10 would be in its operating position, with the yoke 22 being upright and the front and rear wheel frames 14, 18 being spaced part from one another, as indicated by the orientation of the seat attachment bracket 33 and the protruding couplings 31*a*, 32*a* of the front and rear rotatable hinges 31, 32 respectively, in FIG. 19(*a*).

In the example corresponding to FIGS. 19(*a*) to (*d*), the pushchair frame 10 has a rear-facing seat attached and therefore the user desires to fold the pushchair into a rear stowed position. The user therefore depresses the depressible pad 28 and twists the grip of the carrying handle 26, which causes the spring-loaded pin 34 to be withdrawn from the latch 35, thereby unlocking the seat attachment bracket 33 and front and rear rotatable hinges 31, 32, as shown in FIG. 19(*b*). The rotatable yoke 22 is therefore free to rotate towards the rear wheel frame 18 (as shown in FIG. 13), permitting the user to commence folding of the pushchair frame 10.

As the pushchair frame 10 is folded, the front and rear wheel frames 14, 18 come together, so that they are generally adjacent one another (as shown in FIG. 14). Once this configuration is achieved, the seat attachment bracket 33 and front and rear rotatable hinges 31, 32 reach the end of their travel, as shown in FIG. 19(*c*), whereupon the locking mechanism is configured to enable the spring-loaded pin 34 to re-engage with the latch 35. The pushchair frame 10 is now in a rear stowed position, suitable for transit or storage.

As a result of the re-engagement of the spring-loaded pin 34 with the latch 35, the movement of the seat attachment bracket 33 is now once more coupled to the gearing of the planetary gear box. Hence, as the pushchair frame 10 is subsequently unfolded, the front and rear rotatable hinges 31, 32 rotate relative to one another by virtue of the front and rear wheel frames 14, 18 moving apart, which thereby causes the seat attachment bracket 33 to automatically rotate into an upright position, as shown in FIG. 19(*d*). In this way, as the pushchair frame 10 is unfolded the yoke 22 adopts its operating position and levels the attached seat 40 by virtue of the self-righting mechanism 30.

Referring now to the example of FIGS. 20(*a*) to 20(*d*), there are shown cross-sectional views of the planetary gearbox arrangement taken along line B-B of FIG. 17, which illustrate the operation of the self-righting mechanism 30 when it is desired to place the pushchair into a front stowed position, e.g. when a front-facing seat is attached to the frame. The principle of operation is the same as that described in relation to FIGS. 19(*a*) to 19(*d*), and so for brevity is not repeated in detail.

As before, the re-engagement of the spring-loaded pin 34 with the latch 35, couples the seat attachment bracket 33 to the gearing of the planetary gear box, which enables the seat attachment bracket 33 to automatically right itself into an upright orientation as the front and rear rotatable hinges 31, 32 are rotated relatively to one another. In this way, the pushchair frame 10 can automatically adopt its operating position as it is unfolded from a front stowed position.

Figure 21:
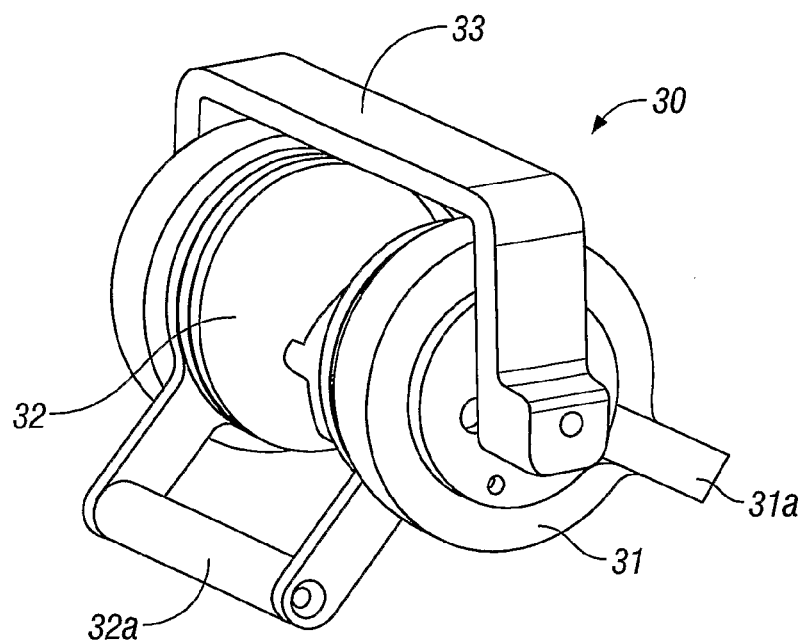
FIG. 21 is a perspective view from the end and to one side of another example self-righting mechanism for use with the pushchair frame of the present invention.
Figure 22:
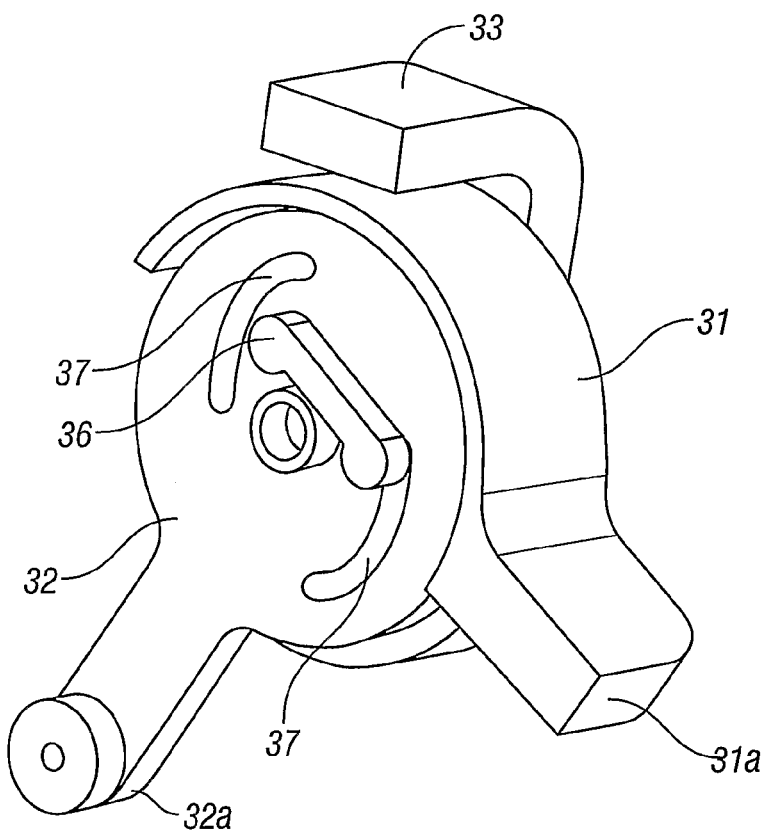
FIG. 22 is a cut-away perspective view of the self-righting mechanism of FIG. 21.

Referring to FIGS. 21 and 22, there is shown an alternative arrangement for the self-righting mechanism according to the present invention. Instead of coupling the front and rear rotatable hinges together by way of a planetary gearbox, the mechanism 30 can be in the form of a cam comprising an elongate pin 36 that engages with arcuate slots 37 in the is front and rear rotatable hinges 31, 34. The pin 36 is connected to the seat attachment bracket 33 in such a way that relative rotation of the front and rear rotatable hinges 31, 32 drives the seat attachment bracket 33 into an upright orientation as the front and rear wheel frames are moved apart, due to the pin 36 being latched against a respective end of a slot 37.

Figure 23A:
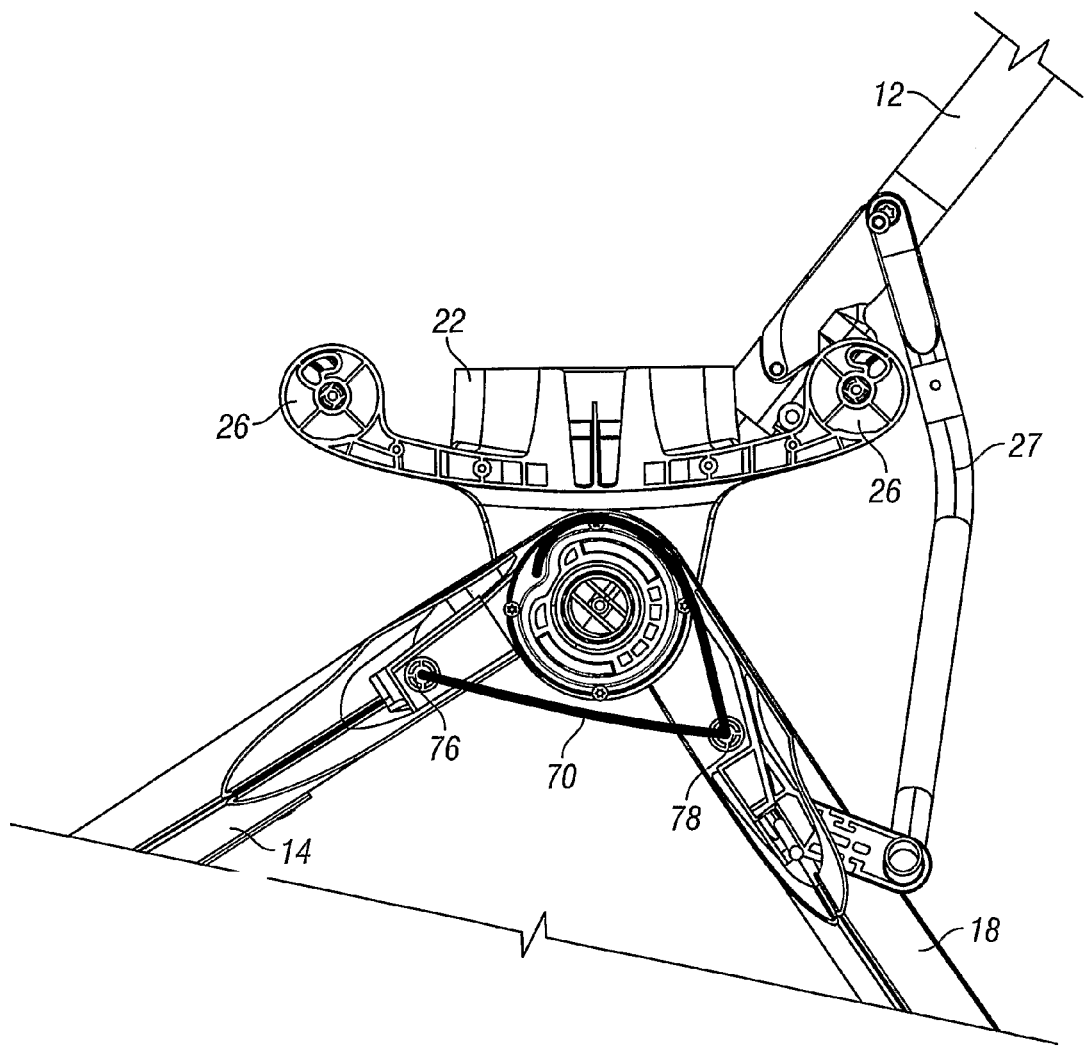
FIGS. 23(a) to 23(c) illustrate a further example of a self-righting mechanism for use with the pushchair frame of the present invention.
Figure 23B:
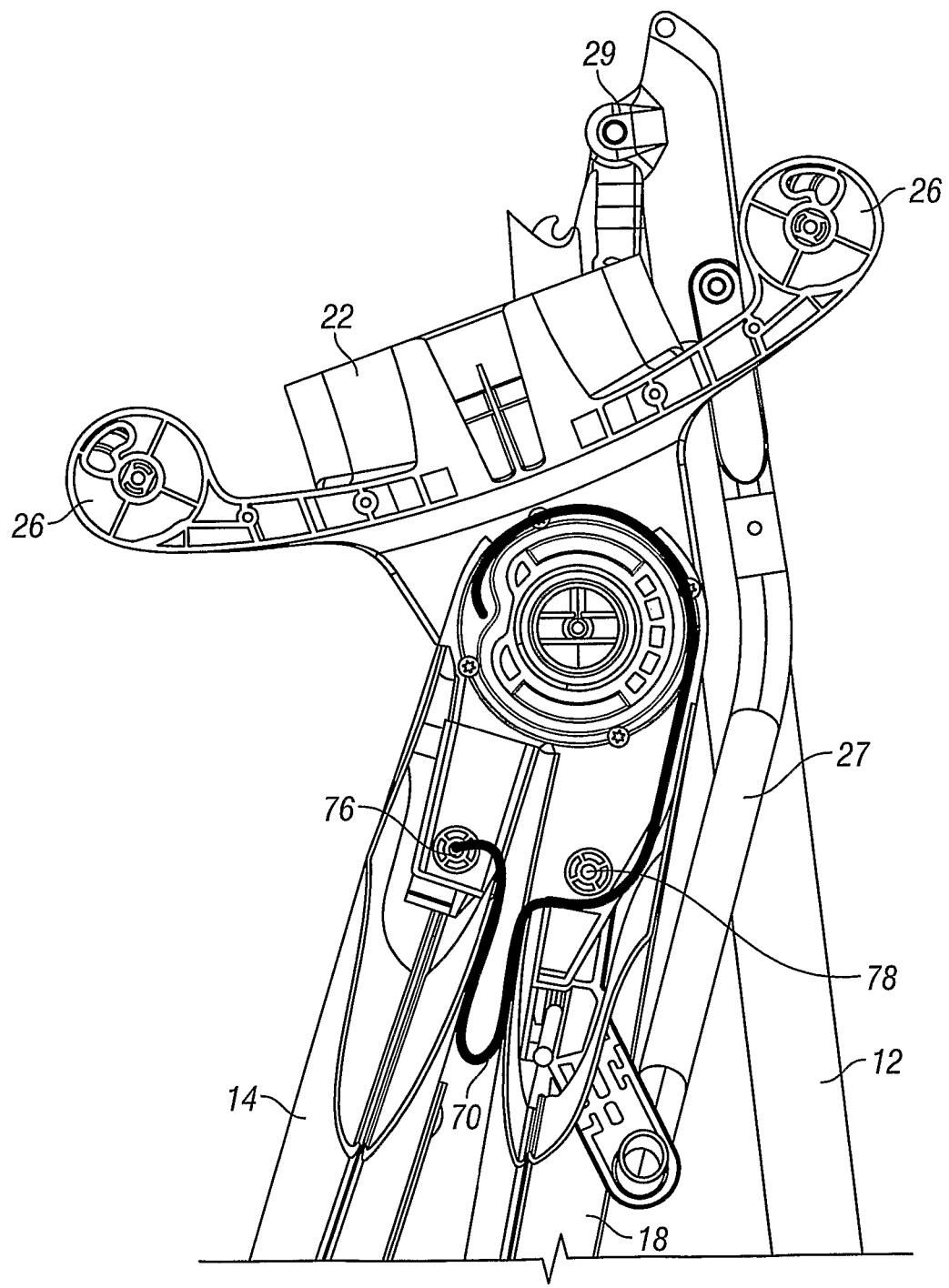
Figure 23C:
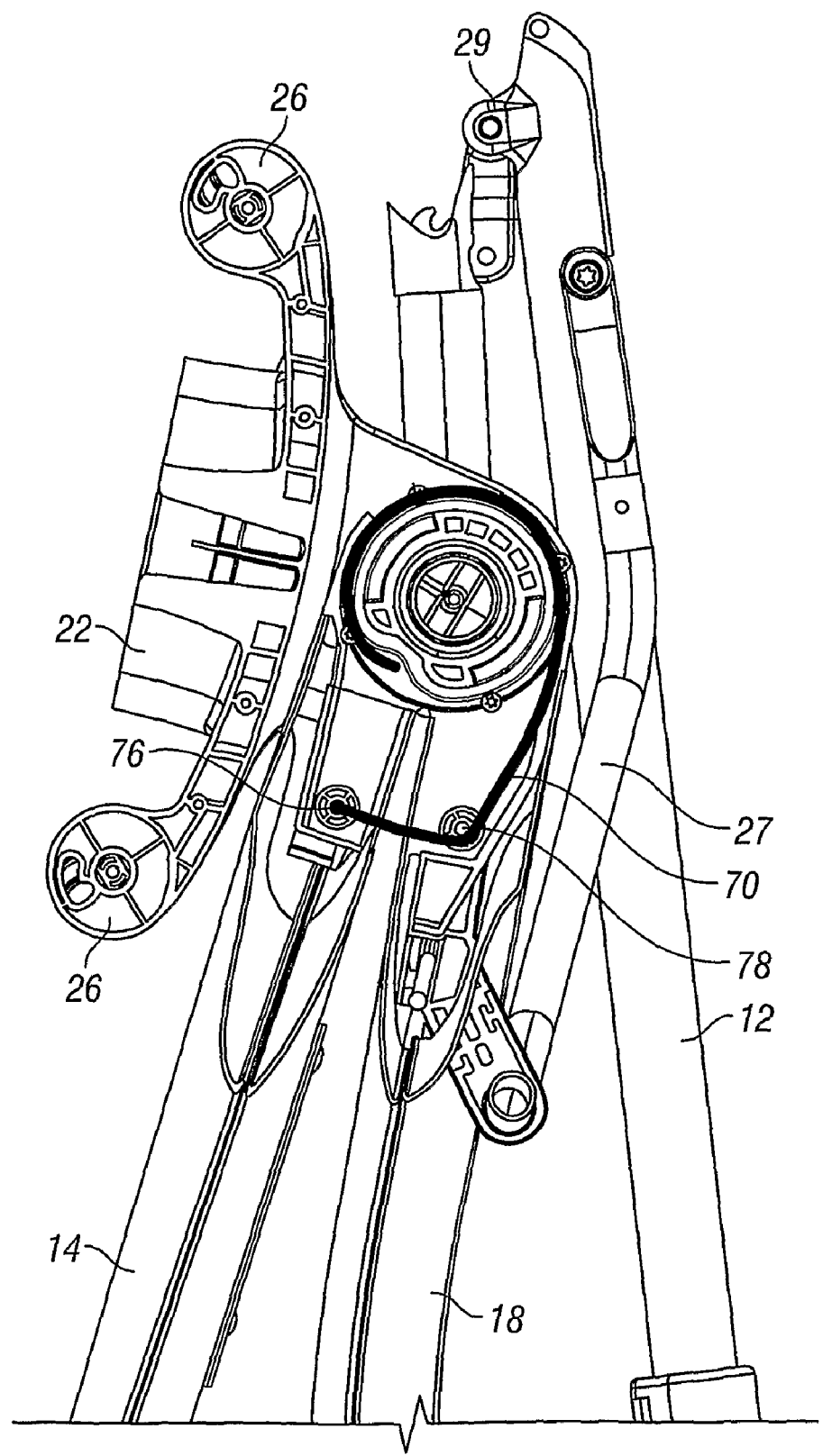

Another arrangement for the self-righting mechanism according to the present invention, is shown in FIGS. 23(*a*) to 23(*c*). This mechanism involves the use of flexible webbing straps 70, 72 to perform the function of automatically self-righting the yoke 22 as the pushchair frame 10 is unfolded.

A webbing strap 70, 72 is coupled to the front wheel frame 14 and the rear wheel frame 18 on either side of the yoke 22, the webbing straps 70, 72 working in opposing directions. One end of each webbing strap 70, 72 is secured to the front wheel frame 14 and the other end of each webbing strap 70, 72 is fixed to the rear wheel frame 18. A first coupling pin 76 is provided on the front wheel frame 14 and a second coupling pin 78 is provided on the rear wheel frame 18. The webbing straps 70, 72 engage with their respective coupling pins 76, 78 at a position along their length as the front and rear wheel frames 14, 18 are moved from their stowed to their operating position. A releasable mechanical lock is provided on either side of the yoke 22, between the yoke 22 and the front and rear wheel frames 14, 18.

In the operating position the webbing straps 70, 72 are taut and maintain the yoke 22 in its operating position, where the releasable locks engage and lock the yoke 22 in position. As the front and rear wheel frames 14, 18 are moved from their operating position to their stowed position, the releasable locks disengage and the webbing straps 70, 72 become slack, bringing them out of engagement with the yoke 22, thereby allowing the yoke 22 to rotate from its operating position to a stowed position. As the front and rear wheel frames 14, 18 are moved from their stowed position to is their operating position, the webbing straps 70, 72 become taut and engage with the yoke 22, raising the yoke 22 into its operating position, and bringing the yoke 22 into alignment with the releasable locks, for locking engagement.

In an alternative arrangement, the function of the releasable mechanical locks on either side of the yoke 22 may be performed by the webbing straps 70, 72 themselves, which may maintain the yoke and the front and rear wheel frames in their operating position without the need for any other additional locking mechanism.

In accordance with another embodiment of the present invention, there is provided a pushchair comprising a pushchair frame 10 and a collapsible seat 40 coupled to the seat mounting yoke 22 of the frame. In one arrangement, the seat 40 is mounted to the frame 10 in a front-facing orientation (as shown by example in FIG. 1), while in another arrangement, the seat 40 is mounted in a rear-facing orientation (as shown by example in FIG. 10). The pushchair frame 10 of either arrangement has the same structure and functionality as described in relational to any of the preceding embodiments and is operable to allow folding of the frame 10 into either front or rear stowed positions (see FIG. 15). The folding and unfolding operations, as previously described, apply also to the pushchair arrangements of this embodiment, and advantageously, the pushchair may be folded without any need for the parent or carer to remove the seat prior to folding the frame, as shown in FIG. 15. Moreover, depending on the configuration of the self-righting mechanism, as the pushchair is unfolded the seat 40 can automatically level itself, thereby enabling the pushchair to assume its operating position with only minimal intervention by the parent or carer. In some embodiments, the self-righting mechanism will only level the yoke 22 when the frame is unfolded according to a prescribed direction of the rotation of the yoke 22, which can alternatively either correspond to the situation when the frame is unfolded from a front stowed position or when it is unfolded from a rear stowed position. Alternatively, depending on the configuration of the self-righting mechanism, the yoke may also be automatically levelled independent of the direction of rotation.

The above embodiments are described by way of example only. Many variations are possible without departing from the invention. For example, the following modifications may be made to and/or used in conjunction with any of the preceding embodiments, without sacrificing any of the preceding advantages. The front wheel frame or rear wheel frame may comprise a single support leg arrangement onto which is rotatably mounted a single wheel. In this way, the pushchair frame may be in the form of a '3-wheeled arrangement' to thereby further enhance manoeuvrability of the pushchair. The push-pull handle may alternatively have a 'split handle' configuration incorporating a spaced interval between opposing grips on the upper part of the handle or comprise two separate symmetric handles. While in a different arrangement, the push-pull handle may be in the form of an elongate shaft having a circular grip at its upper end. In any of these arrangements, the handle(s) can be configured to fold upon release of lockable hinges of a type as described above in relation to the preceding embodiments or as known in the prior art.

Other modifications may include the use of different actuators, so that the 'press and twist' operated actuators may be replaced by hand-operated or foot-operated levers, or pull-cords etc. Moreover, the pushchair of the present invention may be configured to use different types of collapsible seat, so that in one arrangement the pushchair comprises a folding child's safety seat mounted to the frame, while in another arrangement the 'seat' may be in the form of a collapsible cot. Hence, in any of these arrangements the frame may still be advantageously folded in either direction (e.g. front or rear stowed positions) without the need to remove the seat prior to collapsing the frame, thereby improving the ease of operation of the pushchair for the parent or carer.

The invention claimed is:

1. A pushchair frame, comprising:
   a push/pull handle;
   a front wheel frame on which at least one front wheel is rotatably mounted;
   a rear wheel frame on which at least one rear wheel is rotatably mounted;
   a seat mounting yoke to which the front and rear wheel frames are coupled, at least one of the front and rear wheel frames being pivotably coupled to the yoke, the wheel frames having respective operating positions in which they are spaced from one another and respective stowed positions in which they are generally adjacent one another;
   the seat mounting yoke being rotatable, relative to at least one of the front and rear wheel frames between a front facing operating position and a front facing stowed position and between a rear facing operating positions and rear facing stowed position, wherein the front facing operating position of the yoke allows for mounting a seat in a front facing orientation, wherein the front facing stowed position of the yoke supports the seat in a position adjacent the front wheel frame, wherein the rear facing operating position of the yoke allows for mounting the seat in a rear facing orientation, and wherein the rear facing stowed position of the yoke supports the seat in a position adjacent the rear wheel frame; and
   retaining means adapted to maintain the yoke and the front and rear wheel frames in their operating position, such that when the retaining means are released, the yoke and the front and rear wheel frames may be moved to their respective stowed positions, thereby folding the pushchair frame.

2. The pushchair frame as claimed in claim 1, wherein:
   both the front and rear wheel frames are pivotably coupled to the yoke.

3. The pushchair frame as claimed in claim 1, wherein:
   the yoke is rotatable relative to both the front and rear wheel frames.

4. The pushchair frame as claimed in claim 1, wherein:
   the retaining means comprise a releasable locking mechanism operable to lock the yoke and the front and rear wheel frames in their respective operating positions.

5. The pushchair frame as claimed in claim 4, further comprising:
   actuation means coupled to the releasable locking mechanism and operable to unlock the yoke and the front and rear wheel frames from their respective operating positions.

6. The pushchair frame as claimed in claim 5, further comprising:
   at least one carrying handle disposed on the yoke.

7. The pushchair frame as claimed in claim 6, wherein:
   the actuation means are disposed on at least one of the carrying handle or push/pull handle.

8. The pushchair frame as claimed in claim 1, wherein:
   the push/pull handle comprises hinge means provided between, and coupling, an upper part and a lower part of the handle, such that the upper part is moveable between an operating position and a stowed position adjacent the rear wheel frame.

9. The pushchair frame as claimed in claim 1, further comprising:
   a self-righting mechanism operable to automatically move the yoke into its front facing operating position from its front facing stowed position as the front and rear wheel frames are moved from their stowed to their respective operating positions and to automatically move the yoke into its rear facing operating position from its rear facing stowed position as the front and rear wheel frames are moved from their stowed to their respective operating positions.

10. The pushchair frame as claimed in claim 9, wherein:
    the self-righting mechanism couples the yoke to both the front wheel frame and the rear wheel frame.

11. The pushchair frame as claimed in claim 9, wherein:
    the retaining means comprise a releasable locking mechanism operable to lock the yoke and the front and rear wheel frames in their respective operating positions; and the self-righting mechanism is configured to engage the releasable locking mechanism when the yoke assumes its respective front facing or rear facing operating position.

12. The pushchair frame as claimed in claim 9, wherein:
    the self-righting mechanism comprises one of a planetary gearbox, a mechanical cam and at least one tensionable flexible engagement member.

13. The pushchair frame as claimed in claim 9, wherein:
    the self-righting mechanism comprises at least one tensionable flexible engagement member in the form of a webbing strap coupled to the front wheel frame and the rear wheel frame.

14. The pushchair frame as claimed in claim 13, wherein:
    the self-righting mechanism further comprises a pair of webbing straps, one on each side of the yoke.

15. The pushchair frame as claimed in claim 1, wherein:
the retaining means comprises at least one tensionable flexible engagement member in the form of a webbing strap coupled to the front wheel frame and the rear wheel frame.

16. The pushchair frame as claimed in claim 1, wherein:
the retaining means comprises comprise a pair of webbing straps that are coupled to the front wheel frame and the rear wheel frame, the webbing straps configured to act as a self- righting mechanism operable to automatically move the yoke into its respective front facing or rear facing operating position as the front and rear wheel frames are moved from their stowed to their operating position.

17. A pushchair, comprising:
a pushchair frame according to claim 1; and
a collapsible seat coupled to the seat mounting yoke of the frame.

\* \* \* \* \*